US011941919B2

(12) United States Patent
Ito et al.

(10) Patent No.: US 11,941,919 B2
(45) Date of Patent: Mar. 26, 2024

(54) TICKET ISSUING SYSTEM, AND TICKET CHECKING APPARATUS

(71) Applicant: PLAYGROUND CO., LTD., Tokyo (JP)

(72) Inventors: Keiji Ito, Shibuya-ku (JP); Hiroki Miyanishi, Shibuya-ku (JP)

(73) Assignee: PLAYGROUND CO., LTD., Tokyo (JP)

( * ) Notice: Subject to any disclaimer, the term of this patent is extended or adjusted under 35 U.S.C. 154(b) by 209 days.

(21) Appl. No.: 17/534,482

(22) Filed: Nov. 24, 2021

(65) Prior Publication Data

US 2022/0084320 A1    Mar. 17, 2022

Related U.S. Application Data

(63) Continuation of application No. PCT/JP2020/021423, filed on May 29, 2020.

(30) Foreign Application Priority Data

May 30, 2019  (JP) .................................. 2019-101142

(51) Int. Cl.
*G07B 5/02* (2006.01)
*G06F 21/32* (2013.01)

(52) U.S. Cl.
CPC .............. *G07B 5/02* (2013.01); *G06F 21/32* (2013.01)

(58) Field of Classification Search
CPC .. G07B 5/02; G07B 5/00; G06F 21/32; G06F 21/36; G06F 21/44; G06F 21/88;
(Continued)

(56) References Cited

U.S. PATENT DOCUMENTS

2004/0188520 A1 * 9/2004 Kohta ................. G06Q 20/342
235/382
2006/0046842 A1 3/2006 Mattice et al.
(Continued)

FOREIGN PATENT DOCUMENTS

JP  2004104530 A  4/2004
JP  2007226441 A  9/2007
(Continued)

OTHER PUBLICATIONS

International Search Report dated Aug. 18, 2020 in corresponding International Application No. PCT/JP2020/021423; 4 pages.

*Primary Examiner* — Matthew Mikels
(74) *Attorney, Agent, or Firm* — Maier & Maier, PLLC

(57) ABSTRACT

A ticket issuing system has a processor and a storage with instructions thereon. The storage stores a feature value table that associates and stores feature value data including feature information pertaining to biometric information and a feature ID for identifying the feature value data. The instructions upon execution by the processor, cause the processor to: acquire user feature information pertaining to biometric information of a user of a ticket to be issued; identify, from among the feature value data stored in the feature value table, similar feature value data for which a similarity with the user feature information satisfies a predetermined criterion to obtain a feature ID corresponding to the similar feature value data; and issue a ticket on which authentication information that includes the feature ID corresponding to the similar feature value data is recorded.

19 Claims, 13 Drawing Sheets

(58) Field of Classification Search
CPC .... G06Q 20/40145; G07C 9/37; G07F 17/42; H04L 63/0861
See application file for complete search history.

(56) References Cited

U.S. PATENT DOCUMENTS

2007/0196001 A1    8/2007   Yanagawa et al.
2008/0051193 A1    2/2008   Kaminkow et al.

FOREIGN PATENT DOCUMENTS

| JP | 200931991 A | 2/2009 |
| JP | 2018018261 A1 | 2/2018 |

\* cited by examiner

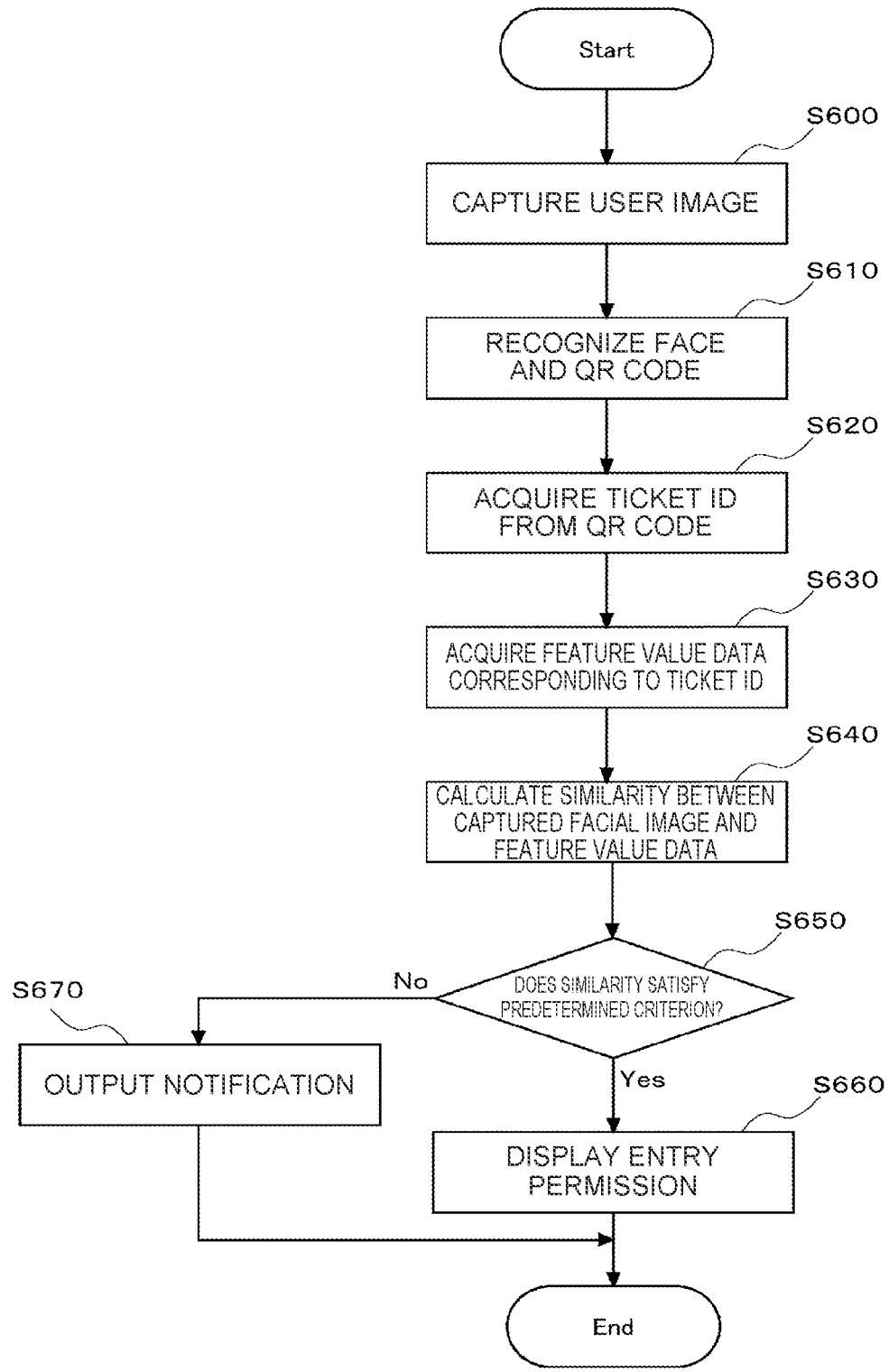

TICKET ISSUING SYSTEM, AND TICKET CHECKING APPARATUS

CROSS-REFERENCE TO RELATED APPLICATIONS

This application is a Continuation Application of No. PCT/JP2020/021423, filed on May 29, 2020, and the PCT application is based upon and claims the benefit of priority from Japanese Patent Application No. 2019-101142, filed on May 30, 2019, the entire contents of which are incorporated herein by reference.

FIELD

The present disclosure relates to a ticket issuing system which issues tickets used for entrance to entertainment or the like, a ticket checking apparatus for checking a ticket issued by the ticket issuing system, and a program that realizes these by means of a computer.

BACKGROUND

Recently, fraudulent resale of tickets for various kinds of entertainment has become a problem. Therefore, it has been proposed to record information of the legitimate owner of a ticket (for example, biometric information capable of distinguishing an individual such as a facial image, a fingerprint, an iris, a vein, or myoelectric potential) on the ticket, and at the time of entry to the venue for the entertainment, to confirm whether or not the person that is attempting to enter using the ticket is the true owner of the ticket. For example, Japanese Patent No. 6163239 discloses a method in which information showing the face of the owner of a ticket or a feature value of the face of the owner is recorded as information of the legitimate owner, an image of the face of the person attempting to enter is captured at the entrance, and whether or not the person attempting to enter is the legitimate owner is confirmed by facial authentication that compares the face of the person in the captured image with the face of the owner or feature value of the face of the owner that is recorded on the ticket. Note that, in the following description, a coupon, a stamp card, an event ticket, a product voucher and the like are referred to collectively as a "ticket".

SUMMARY

In the conventional method for verifying the owner of a ticket by utilizing facial authentication, including the method disclosed in Japanese Patent No. 6163239, an image of the face of the legitimate owner or a feature value of the face is recorded on the ticket as information pertaining to the face of the legitimate owner. The image of the face or feature value of the face is the owner's personal information, and when such information is recorded on a ticket, there is a possibility that the personal information may be unintentionally passed to a third party, and hence this has sometimes been regarded as a problem from the viewpoint of protection of personal information and security. There is a concern that by analyzing data which has been recorded for a large number of tickets to thereby reveal information (or a method for identifying such information) of the legitimate owners which is required for facial authentication, it will be possible to fraudulently create tickets. Further, the information amount of an image of a face is large, and even when only feature values are recorded so as to reduce the information amount, it takes time to read and verify the information when performing a ticket check, and in some cases visitors cannot be processed smoothly, resulting in congestion or delays. Further, although a method also exists in which the authentication of individuals is strengthened by means of electronic tickets by the use of smartphones or the like, such a method involves various problems including the problem that the method cannot be applied to users who do not possess a smartphone and also the problem that an inconvenience will occur if the smartphone battery runs out, and these problems have hindered the widespread use of such a method.

BRIEF DESCRIPTION OF DRAWINGS

FIG. 13 is a flowchart showing a procedure of ticket checking processing in the fifth embodiment.

DETAILED DESCRIPTION

Figure 1:
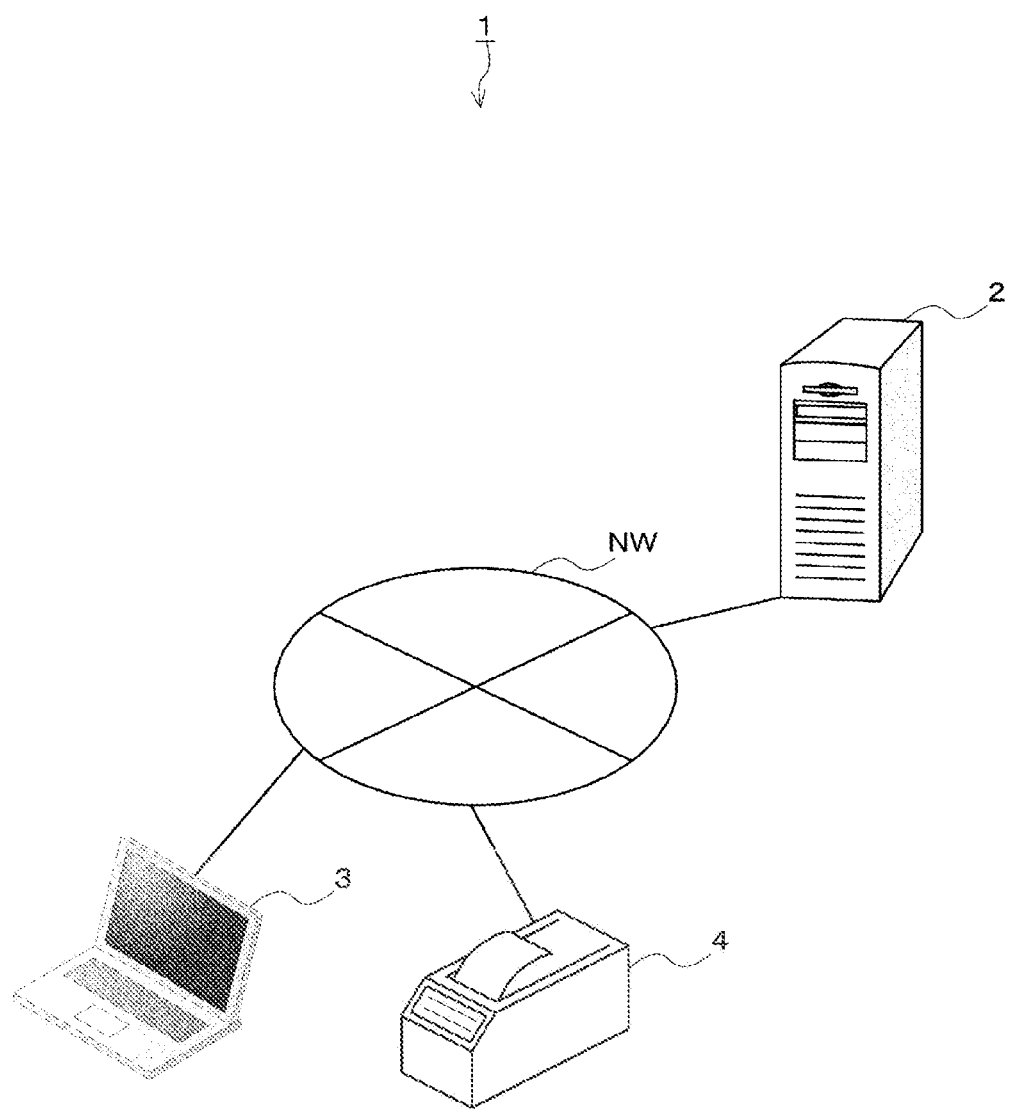
FIG. 1 is a schematic diagram illustrating a configuration of a ticket issuing system.

A ticket issuing system according to an embodiment of the present disclosure has been made to solve the problem described above, and includes: a feature value table that associates and stores feature value data including feature information pertaining to exemplary biometric information and a feature ID for identifying the feature value data; user feature information acquisition means for acquiring feature information pertaining to biometric information of a user of a ticket to be issued; similar feature value data identification means for, from among the feature value data stored in the feature value table, identifying similar feature value data for which a similarity with feature information pertaining to biometric information that the user feature information acquisition means acquired satisfies a predetermined criterion, and acquiring the feature ID corresponding to the similar feature value data; and issuing means for issuing a ticket on which authentication information that includes the feature ID corresponding to similar feature value data which the similar feature value data identification means acquired is recorded.

In the present disclosure, the feature information pertaining to the biometric information may be feature information pertaining to the appearance of a face of a person. Further, the authentication information may include feature IDs corresponding to a plurality of items of feature value data. Further, in addition to the feature ID, the authentication information may include a ticket ID for identifying the ticket and/or information pertaining to entertainment which it is possible to enter using the ticket.

In the present disclosure, the issuing means may record the feature ID on a face of a ticket in a machine-readable form. Further, feature value data stored in the feature value table may include feature information pertaining to the appearance of a non-existent person.

In the present disclosure, the ticket issuing system may further include feature value data registration means for, in a case where the similar feature value data identification means cannot identify similar feature value data for which a matching rate with respect to feature information pertaining to biometric information that the user feature information acquisition means acquired is a predetermined value or more from among the feature value data stored in the feature value table, based on biometric information which the user feature information acquisition means acquired, registering new feature value data for which a matching rate with respect to biometric information which the user feature information acquisition means acquired is a predetermined value or more in the feature value table.

A ticket issuing system according to another embodiment of the present disclosure includes: a feature value table that associates and stores feature value data including feature information pertaining to exemplary biometric information and a feature ID for identifying the feature value data; user feature information acquisition means for acquiring feature information pertaining to biometric information of a user of a ticket to be issued; similar feature value data identification means for, from among the feature value data stored in the feature value table, identifying similar feature value data for which a similarity with feature information pertaining to biometric information which the user feature information acquisition means acquired satisfies a predetermined criterion, and acquiring the feature ID corresponding to the similar feature value data; issuing means for issuing a ticket on which authentication information that includes a ticket ID for identifying a ticket that is issued is recorded; and recording means for recording the feature ID corresponding to similar feature value data which the similar feature value data identification means acquired, in association with the ticket ID.

Further, a ticket checking apparatus according to an embodiment of the present disclosure checks, at a ticket checking station, a ticket which a user who attempts to pass through the ticket checking station holds. The ticket checking apparatus includes: a feature value table that associates and stores feature value data that is feature information pertaining to exemplary biometric information and identification information; user biometric information acquisition means for acquiring biometric information of the user who uses the ticket; feature information calculation means for calculating feature information with respect to biometric information of the user which the user biometric information acquisition means acquired; identification information acquisition means for acquiring identification information that is recorded on the ticket; comparison feature value data acquisition means for referring to the feature value table to acquire the feature value data associated with the identification information that the identification information acquisition means acquired; and determination means for obtaining a matching rate between feature information which the feature information calculation means calculated and feature value data acquired by the comparison feature value data acquisition means, and outputting a determination result according to the matching rate.

In the present disclosure, the feature information pertaining to the biometric information may be feature information pertaining to the appearance of a face of a person.

In the present disclosure, the ticket checking apparatus may further include: similar feature value data identification means for, in a case where the identification information is not recorded on the ticket, from among the feature value data stored in the feature value table, identifying similar feature value data for which a matching rate with respect to feature information pertaining to biometric information which the feature information calculation means acquired is a predetermined value or more, and acquiring the identification information corresponding to the similar feature value data; and similar feature value data recording means for recording the identification information corresponding to the similar feature value data which the similar feature value data identification means identified, as similar feature value data corresponding to the ticket.

In the present disclosure, the identification information may be recorded on the ticket in a machine-readable form. Further, the identification information acquisition means may read the identification information which is recorded on the ticket that the user holds, and acquire the identification information.

In the present disclosure, the user biometric information acquisition means and the identification information acquisition means may be realized by a common imaging means, the imaging means may capture a user image that includes the face of the user and the ticket which the user holds, and the identification information acquisition means may analyze the user image which the imaging means captures, and read the identification information which is recorded on the ticket which the user holds. At this time, in the user image, the feature information calculation means may recognize a face appearing at a predetermined position relative to a face of the ticket as the face of a visitor, and calculate feature information pertaining to the appearance of the face.

In the present disclosure, the user biometric information acquisition means may be realized by imaging means, the imaging means may acquire a user image that includes the face of the user, and the user appearing in the user image may be identified based on a distance from the imaging means to a person appearing in the user image, and biometric information of the user may be acquired.

Further, a ticket checking apparatus according to another embodiment of the present disclosure is a ticket checking apparatus that, at a ticket checking station, checks a ticket which a user who attempts to pass through the ticket checking station holds. The ticket checking apparatus includes: a feature value table that associates and stores feature value data which is feature information pertaining to exemplary biometric information and a feature ID; a ticket information table that associates and stores a ticket ID for identifying a ticket and the feature ID corresponding to a user of the ticket; user biometric information acquisition means for acquiring biometric information of the user who uses the ticket; feature information calculation means for calculating feature information with respect to biometric information of the user which the user biometric information acquisition means acquired; ticket ID acquisition means for acquiring the ticket ID which is recorded on the ticket; comparison feature value data acquisition means for referring to the ticket information table to identify the feature ID associated with the ticket ID that the ticket ID acquisition means acquired, and referring to the feature value table to acquire the feature value data corresponding to the feature ID that is identified; and determination means for obtaining a similarity between feature information which the feature information calculation means calculated and feature value data acquired by the comparison feature value data acquisition means, and outputting a determination result according to the similarity.

A program according to an embodiment of the present disclosure causes a computer to function as any one of the ticket issuing systems described above. Further, a program according to an embodiment of the present disclosure causes a computer to function as any one of the ticket checking apparatuses described above.

First Embodiment

Hereunder, a ticket issuing system 1, and a ticket checking apparatus 5 that conducts a check on a ticket that the ticket issuing system 1 issued according to a first embodiment of the present disclosure are described with reference to the accompanying drawings.

FIG. 1 is a schematic diagram illustrating the configuration of the ticket issuing system 1. As illustrated in FIG. 1, the ticket issuing system 1 includes a server 2, a ticket purchasing terminal 3, and a ticket issuing machine 4. The server 2, the ticket purchasing terminal 3 and the ticket issuing machine 4 are communicably connected through a network NW. Note that the server 2, the ticket purchasing terminal 3 and the ticket issuing machine 4 may be disposed at remote locations at which they are physically separated from each other, or some or all thereof may be disposed at the same location.

The server 2, for example, is a computer system, and has an input/output device such as a keyboard, a mouse or a touch panel, a main body including a calculation unit such as a CPU (Central Processing Unit) and storage devices such as a RAM (Random Access Memory) and a ROM (Read Only Memory), and a display device such as a CRT (Cathode Ray Tube) or an LCD (Liquid Crystal Display), and the like.

Figure 2:
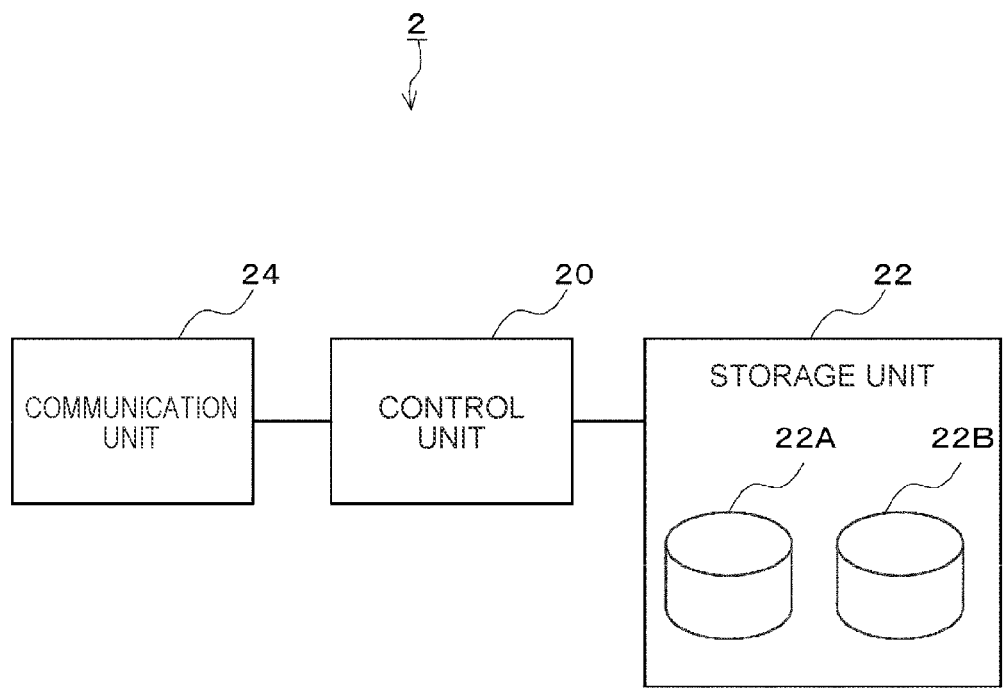
FIG. 2 is a block diagram illustrating a configuration of a server.

FIG. 2 is a block diagram illustrating the configuration of the server 2. As illustrated in FIG. 2, the server 2 includes at least a control unit 20, a storage unit 22, and a communication unit 24. In addition to these components, as necessary, the server 2 may also include input means (for example, a keyboard and/or a mouse) and output means (for example, a display and/or a printer).

The control unit 20 executes processing according to a program stored in the storage unit 22 based on a request or the like transmitted from the ticket purchasing terminal 3. For example, the control unit 20 executes processing such as retrieval, new registration, deletion, and updating of data with respect to a ticket database 22A and a feature value table 22B stored in the storage unit 22, and executes processing to find feature value data with respect to which a similarity between an image of a face (hereinafter, an image of a face is sometimes referred to simply as a "facial image") of a ticket owner and the feature value data satisfies a predetermined criterion (for example, a matching rate is a predetermined value or more) from the feature value table 22B. That is, based on a program stored in the storage unit 22, the control unit 20 functions as similar feature value data identification means for, from among the feature value data stored in the feature value table 22B, identifying similar feature value data for which a similarity with a facial image of a user satisfies a predetermined criterion, and acquiring a feature ID corresponding to the similar feature value data. Further, based on a program stored in the storage unit 22, in a case where the control unit 20 cannot identify similar feature value data for which a similarity with a facial image of a user satisfies a predetermined criterion from among feature value data stored in the feature value table 22B, the control unit 20 functions as feature value data registration means for, based on a facial image of a user, registering new feature value data for which a similarity with the facial image of the relevant user satisfies a predetermined criterion, in the feature value table 22B.

A program executed by the control unit 20, data used by the program, and the like are stored in the storage unit 22. For example, the storage unit 22 stores: a program for realizing the functions of the server 2 in the ticket issuing system 1; the ticket database 22A for collecting information pertaining to tickets that are issued by the ticket issuing system 1; and the feature value table 22B that stores feature value data including feature information pertaining to exemplary biometric information in association with a feature ID that is identification information. In the present embodiment, the feature information pertaining to biometric information included in the feature value data is feature information (for example, a parameter value of a feature value) pertaining to the appearance of the face of a person. The feature value table 22B may include feature value data that is based on an image of a face of a non-existent person (for example, information representing facial features calculated from a face generated by computer graphics or a drawing or the like). Further, the feature value table 22B may include feature value data generated by an arithmetical operation without being based on an image of a face. In the case of generating feature value data by means of an arithmetical operation, it is favorable to generate the feature value data so that the feature value data is distributed at an equal density in a feature value space in which the feature value data can be represented. The server 2 does not have to be configured such that the components described above are physically integrated. For example, some or all of the aforementioned components may be distributed and arranged in remote locations, and they may cooperate to function as the server 2. Under the control of the control unit 20, the communication unit 24 communicates with the ticket purchasing terminal 3, the ticket issuing machine 4 and the like via the network NW.

The ticket purchasing terminal 3 is an apparatus that is operated by a purchaser or a sales assistant in a ticket sales office when a purchaser is purchasing a ticket, to send information necessary for issuing a ticket to the server 2. Here, the information necessary for issuing a ticket includes at least information on the ticket which it is intended to purchase, and a facial image of the person (typically the purchaser) who will be the owner of the purchased ticket. The ticket purchasing terminal 3 may be, for example, a terminal device installed in a ticket sales office, or a computer which each individual purchaser possesses.

Figure 3:
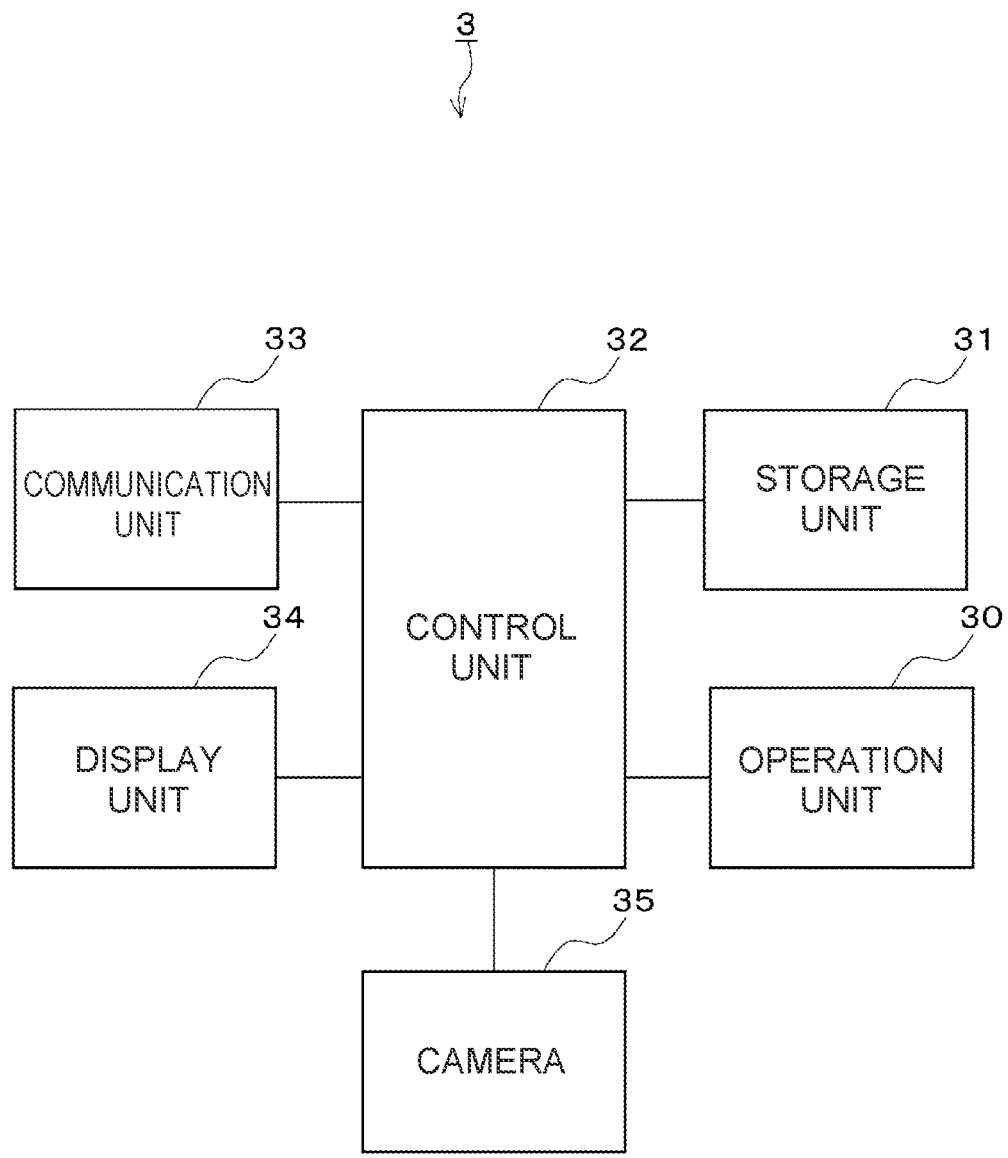
FIG. 3 is a block diagram illustrating a configuration of a ticket purchasing terminal.

FIG. 3 is a block diagram illustrating a configuration of the ticket purchasing terminal 3. As illustrated in FIG. 3, the ticket purchasing terminal 3 includes at least an operation unit 30, a storage unit 31, a control unit 32, a communication unit 33, a display unit 34, and a camera 35. For example, a notebook computer or a tablet terminal or the like which has the camera 35 built therein may be used as the ticket purchasing terminal 3, or a computer which does not have the camera 35 built therein may be connected to the camera 35 and used as the ticket purchasing terminal 3. In the present embodiment, the camera 35 functions as one part of user feature information acquisition means for acquiring feature information pertaining to biometric information of a user of a ticket to be issued.

The operation unit 30 accepts operations performed by a purchaser or a sales assistant at a ticket sales office. The operation unit 30 includes a touch panel arranged in a superimposed manner on the display unit 34, and other buttons. The storage unit 31 is a storage medium such as a ROM, a RAM, or a hard disk, and stores programs executed by the control unit 32, data used by the programs, and the like. For example, an operating system (OS), an application program for transmitting information necessary for purchasing/issuing a ticket to the server 2, and the like are stored in the storage unit 31. The control unit 32 is an arithmetic unit such as a CPU, and executes various programs stored in the storage unit 31. The communication unit 33 conducts communication with the server 2 via the network NW. The display unit 34 is a display device such as a liquid crystal display or an organic EL display, and displays various information (for example, a user interface for purchasing a ticket) under the control of the control unit 32. The display unit 34 realizes various input interfaces in cooperation with the touch panel of the operation unit 30.

Figure 4:
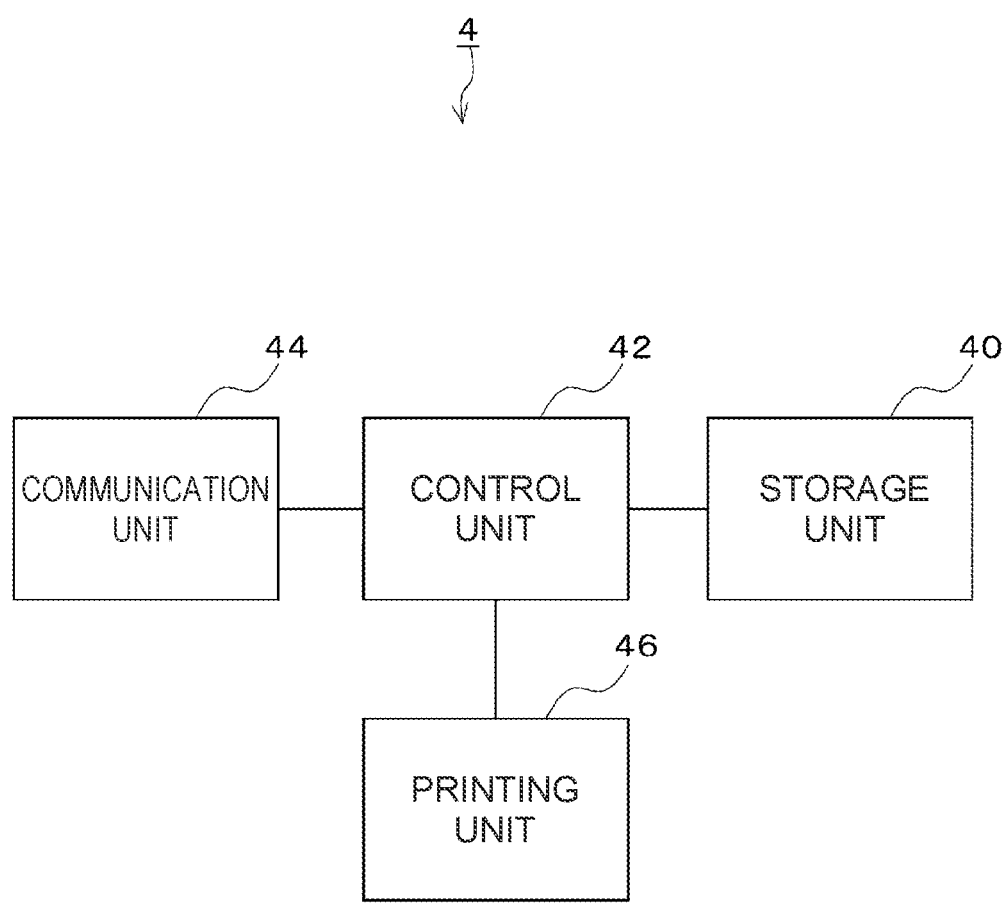
FIG. 4 is a block diagram illustrating a configuration of a ticket issuing machine.

The ticket issuing machine 4 prints the ticket information on a predetermined paper sheet and issues the ticket based on instructions from the server 2. The ticket issuing machine 4 records authentication information that includes a feature ID (identification information) corresponding to similar feature value data on the face of the ticket in a machine-readable form, together with various information such as information regarding the entertainment which the ticket enables entry to. Specifically, a feature ID or the like is encoded in a QR code (registered trademark), and the QR code is printed on the face of the ticket. The ticket issuing machine 4 may be disposed at the same location as the ticket purchasing terminal 3 (for example, a ticket sales office). FIG. 4 is a block diagram illustrating a configuration of the ticket issuing machine 4. As illustrated in FIG. 4, the ticket issuing machine 4 includes at least a storage unit 40, a control unit 42, a communication unit 44 and a printing unit 46. In addition to these components, as necessary, the ticket issuing machine 4 may also include input means (for example, a keyboard or a mouse) and output means (for example, a display or a printer).

Programs executed by the control unit 42, data used by the programs, and the like are stored in the storage unit 40. For example, a program that controls the printing unit 46 so as to print ticket information based on instructions from the server 2 and the like are stored in the storage unit 40.

The control unit 42 executes various programs stored in the storage unit 40. For example, the control unit 42 controls the printing unit 46 so as to print a ticket in accordance with instructions from the server 2.

The communication unit 44 conducts communication with the server 2 via the network NW. In addition, the communication unit 44 may be configured to be capable of near-field wireless communication (NFC), infrared communication, visible light communication, or the like. The printing unit 46 is a printer that prints the ticket on a predetermined paper sheet. The paper sheet used for the ticket may be, for example, a piece of paper that has been pre-cut to predetermined dimensions in which, as necessary, perforations are provided, or may be a roll of paper which is cut to a predetermined length each time printing is performed.

Figure 5:
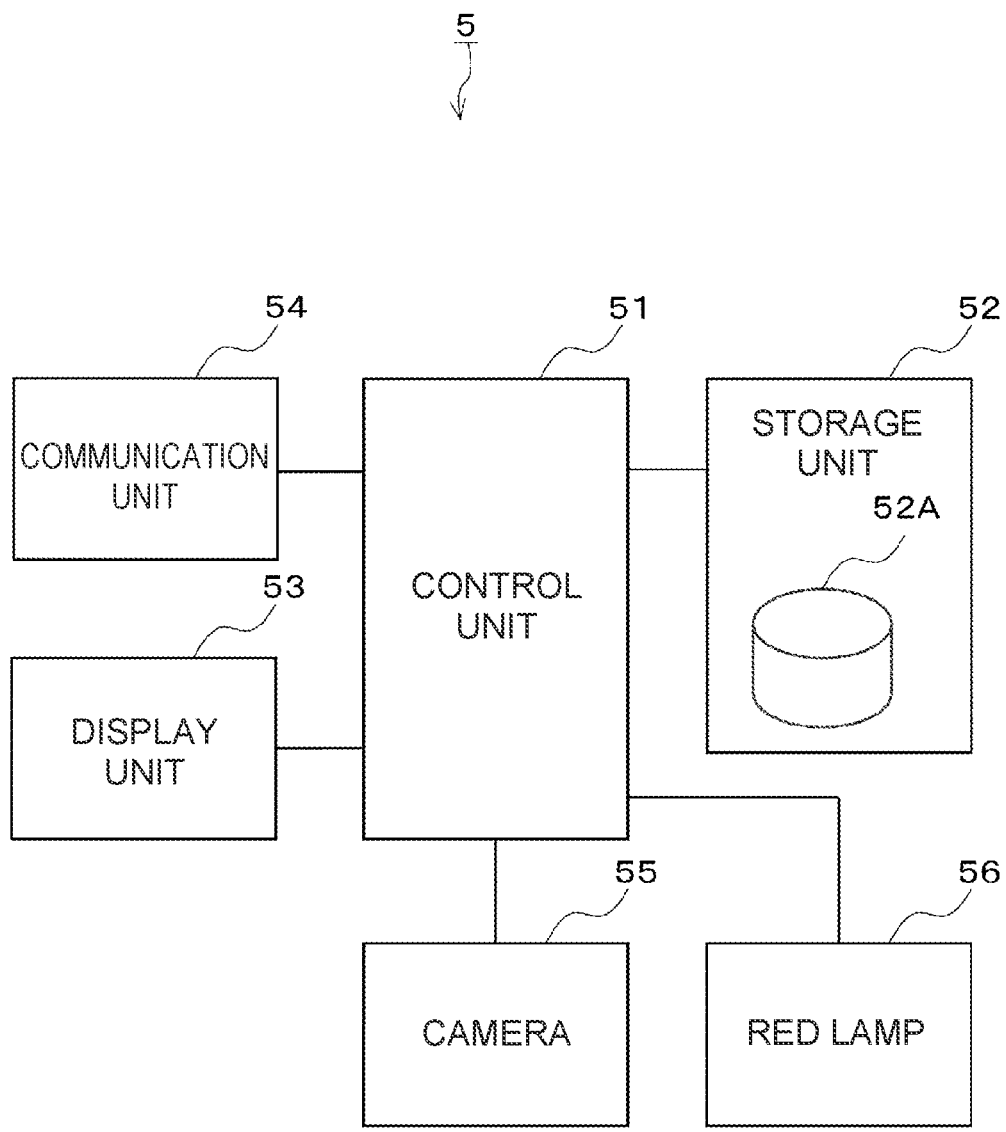
FIG. 5 is a block diagram illustrating a configuration of a ticket checking apparatus.

The ticket checking apparatus 5 is an apparatus for, at a ticket checking station, checking a ticket which a user who is attempting to pass through the ticket checking station holds. In the present example, the ticket checking apparatus 5 checks a ticket that was issued by the ticket issuing system 1, at a ticket checking station provided at an entrance to entertainment. FIG. 5 is a block diagram illustrating a configuration of the ticket checking apparatus 5. The ticket checking apparatus 5 includes a control unit 51, a storage unit 52, a display unit 53, a communication unit 54, and a camera 55. In addition to these components, as necessary, the ticket checking apparatus 5 may also include input means (for example, a keyboard or a mouse). A notebook computer or a tablet terminal or the like which has the camera 55 built therein may be used as the ticket checking apparatus 5.

The control unit 51 is an arithmetic unit such as a CPU, and executes various programs stored in the storage unit 52. The storage unit 52 is a storage medium such as a ROM, a RAM, or a hard disk, and stores programs executed by the control unit 51, data used by the programs, and the like. For example, an operating system (OS), a program for performing processing for ticket checking, and a feature value table for ticket checking 52A and the like are stored in the storage unit 52. The feature value table for ticket checking 52A is a database that stores feature value data which is information that shows features of a face of a person in association with a feature ID which is identification information. The feature value table 22B that is used by the server 2 when issuing tickets may be used as it is (including feature value data which could not be identified as similar feature value data when issuing a ticket) as the feature value table for ticket checking 52A, or the feature value table for ticket checking 52A may be configured so as to store only feature value data that was identified as similar feature value data when issuing a ticket.

The display unit 53 is a display device such as a liquid crystal display or an organic EL display, and displays various information under the control of the control unit 51. The communication unit 54 conducts communication with the server 2 and the like via the network NW. The camera 55 corresponds to user biometric information acquisition means in the present disclosure, and is arranged so as to capture an image in the front direction of the ticket checking apparatus 5, and captures a user image that includes the face of a user who uses a ticket as well as the ticket which the user holds. A red lamp 56 is one example of notification means that operates under the control of the control unit 51, and for example, is controlled so as to turn on in a case where the similarity between a facial image extracted from a user image and feature value data acquired from the feature value table for ticket checking does not satisfy a predetermined criterion (for example, a matching rate does not exceed a predetermined value).

The control unit 51 extracts a facial image of a user from a user image captured with the camera 55, based on a program stored in the storage unit 52. Further, based on a program stored in the storage unit 52, the control unit 51 analyzes the user image captured with the camera 55 to read the QR code recorded on the ticket which the user holds, and thereby acquires the feature ID encoded in the QR code. In addition, based on a program stored in the storage unit 52, the control unit 51 refers to the feature value table for ticket checking 52A to acquire feature value data associated with the acquired feature ID. Furthermore, based on a program stored in the storage unit 52, the control unit 51 determines the similarity between the facial image extracted from the user image and the feature value data acquired from the feature value table for ticket checking, and if the similarity satisfies a predetermined criterion, the control unit 51 allows the relevant user to pass through the ticket checking station. In this way, by executing programs stored in the storage unit 52, the control unit 51 realizes the functions of feature information calculation means, identification information acquisition means, facial image acquisition means, and determination means of the present disclosure.

[Issuing of Tickets]

Figure 6:
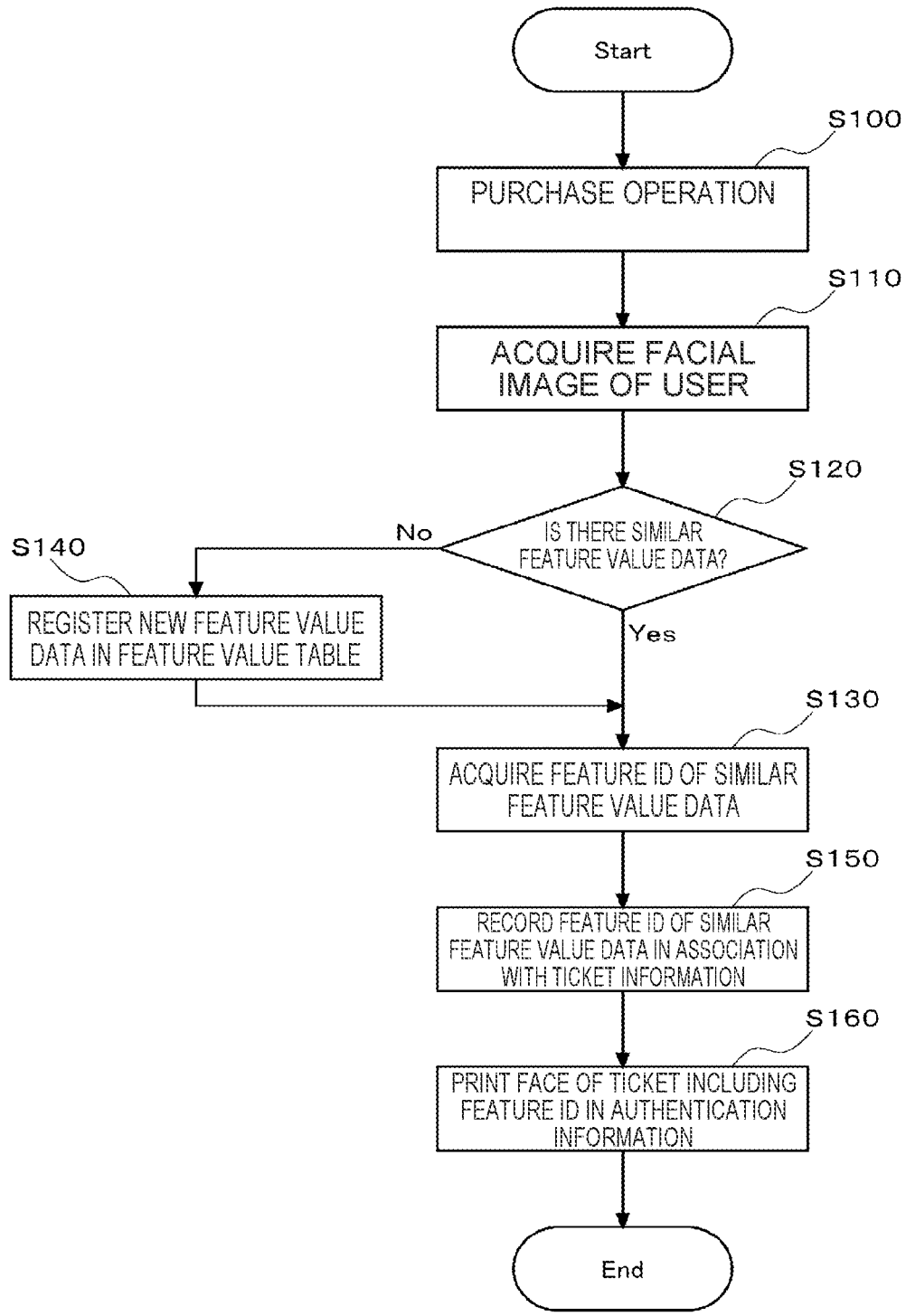
FIG. 6 is a flowchart showing a procedure of ticket issuing processing.

Next, the procedure of ticket issuing processing for issuing a ticket by the ticket issuing system 1 configured as described above will be described with reference to the flowchart shown in FIG. 6.

In the present example, issuing of a ticket is performed when a purchaser or a sales assistant in a ticket sales office operates the ticket purchasing terminal 3. In the present example, a case in which the purchaser themselves will be the user of the ticket (that is, the person who will utilize the ticket to pass through the entrance to the entertainment) is described as an example. First, the purchaser or a sales assistant in a ticket sales office performs a purchase operation at the ticket purchasing terminal 3 by selecting the entertainment, the seat type and the like, and pressing a purchase button or the like (step S100). The ticket purchasing terminal 3 sends information showing the selected ticket as well as a facial image of the user to the server 2, and the server 2 acquires the information and facial image (step S110). The facial image may be captured with the camera 35 of the ticket purchasing terminal 3, or a facial image which the user photographed in advance may be transferred into the ticket purchasing terminal 3 by wired or wireless communication.

The server refers to the feature value table 22B to check for the facial image of the user received from the ticket purchasing terminal 3 (step S120). At this time, the server 2 calculates the similarity between each item of feature value data stored in the feature value table 22B and the face of the user by an arbitrary facial matching method. Note that, with regard to the similarity between the facial image and the feature value data, it is favorable to extract information of a feature value from the facial image, and calculate a matching rate by an arithmetic operation based on the extracted feature value and feature value information included in the feature value data. Further, the similarity is calculated, for example, as a score normalized to a value from 0 to 10. Then, if there is feature value data for which the similarity with the facial image of the user satisfies a predetermined criterion (step S120: Yes), the server 2 identifies one item of similar feature value data for which the similarity with the facial image of the user satisfies the predetermined criterion, and acquires the feature ID that corresponds to the identified similar feature value data item (step S130). Note that, after identifying the similar feature value data, it is preferable that the server 2 completely delete the facial image of the user from the server 2.

With regard to the facial image of the user, the server 2 may calculate a matching rate with respect to all of the items of feature value data included in the feature value table 22B, and identify an item of feature value data that has the highest matching rate as the feature value data for which the similarity satisfies a predetermined condition. Alternatively, a configuration may be adopted so as to check feature value data items one by one in an arbitrary order, and at a time point at which one item of feature value data for which the similarity satisfies a predetermined condition (for example, the matching rate is a predetermined value or more) is found, the item of feature value data in question is identified as similar feature value data, and no further checking of the feature value data is performed. In the case of identifying the feature value data item for which the matching rate is highest, although it takes time to complete the processing, the authentication accuracy can be increased. In the case of performing no further checking of the feature value data once a feature value data item for which the similarity satisfies a predetermined condition is found, although there is a possibility that the authentication accuracy will be sacrificed, it will be possible to finish the processing in a short time.

If feature value data for which the similarity with the facial image of the user satisfies a predetermined criterion is not included in the feature value table 22B (step S120: No), the server 2 registers new feature value data that is based on the facial image of the user in the feature value table 22B (step S140), and then identifies the relevant new feature value data as similar feature value data, and acquires the feature ID of the new feature value data (step S130).

When newly registering feature value data in step 140, although the server 2 may register information showing facial features calculated from the facial image of the user themselves as the feature value data, it is preferable to generate and register feature value data, not the facial image of the user itself, for which the similarity with the facial image of the user satisfies a predetermined criterion. Specifically, it is good to generate feature value data for which the matching rate with the facial image of the user is a predetermined value or more but which does not completely match the facial image of the user (there is a portion that is dissimilar to a moderate degree). In this way, the facial image of the user, which is personal information, will not be included as it is in the feature value table 22B, and operations that take privacy into consideration can be performed.

Upon the similar feature value data being identified, the server 2 links the feature ID of the identified similar feature value data with the information of the ticket to be purchased, and stores the feature ID in the ticket database 22A (step S150).

Next, the server 2 generates information to print on the face of the ticket, and transmits the information to the ticket issuing machine 4 (step S160). The information to print on the face of the ticket includes authentication information that is required when the ticket is checked at the time of entry, information that shows the entertainment, information that shows the ticket type, and the like. In the present example, the authentication information is a QR code (registered trademark) that includes the feature ID of the similar feature value data.

Figure 7:
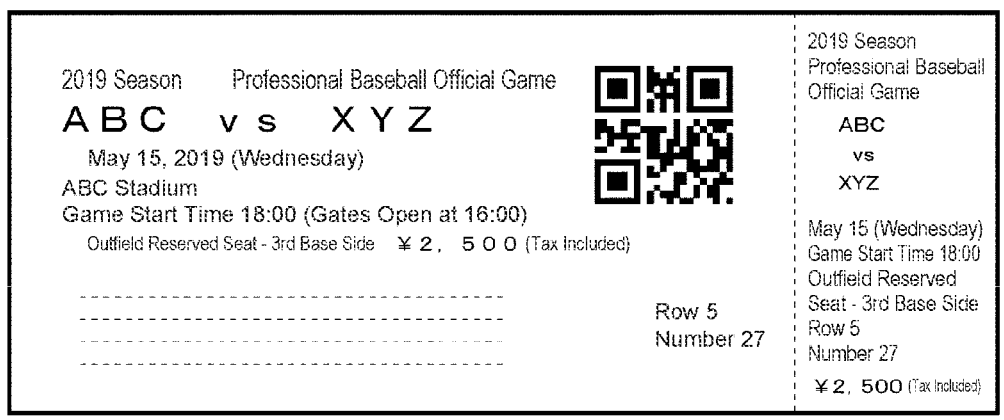
FIG. 7 is a view illustrating one example of the face of a ticket issued by the ticket issuing system.

At the ticket issuing machine 4 that receives the information to print on the face of the ticket, as illustrated in FIG. 7, characters showing information on the entertainment and information on the ticket type and the like, and a QR code that includes the authentication information are printed on the face of the ticket.

Since the ticket issued in the manner described above does not include personal information such as a facial image of the user in the authentication information, leakage of personal information through the ticket can be prevented. Further, the data amount of the feature ID of the similar feature value data is small compared to a facial image itself, and hence reading of the authentication information when performing ticket checking processing that is performed using the ticket checking apparatus 5 as described later can be finished in a short time.

[Use of Tickets]

Figure 8:
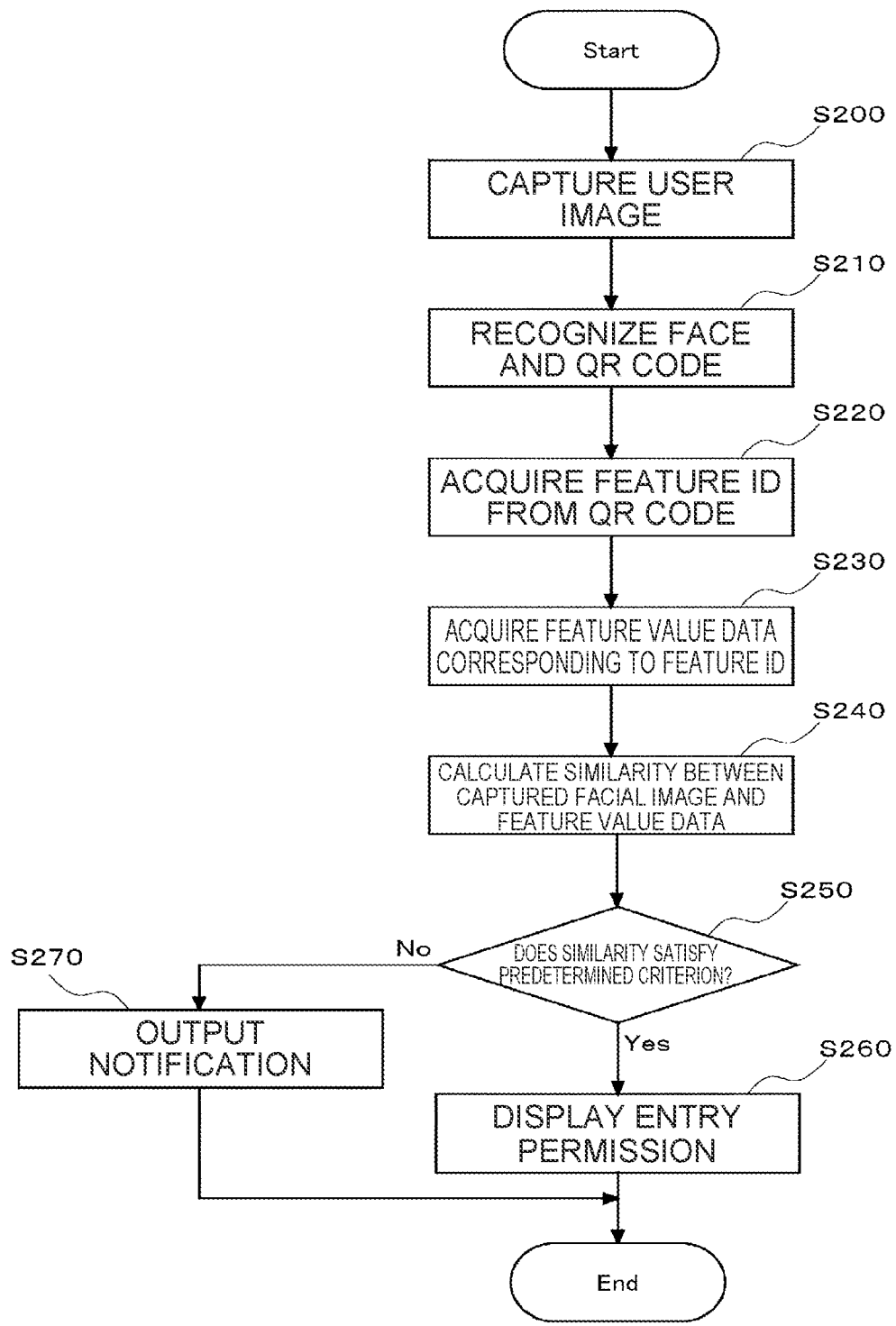
FIG. 8 is a flowchart showing a procedure of ticket checking processing.

Next, a procedure of ticket checking processing that individual visitors are subjected to at a ticket checking station provided at an entrance to the venue for the entertainment, such as an event, to check a ticket issued by the ticket issuing system 1 will be described referring to the flowchart shown in FIG. 8.

A ticket checking station is provided at the entrance of the venue for the entertainment, and the ticket checking apparatus 5 is installed so that the camera 55 faces in the direction from which visitors come in. The feature value table for ticket checking 52A in which the feature value data that was used when issuing tickets is stored, is stored in advance (before the admission start time) in the ticket checking apparatus 5. Note that, it is favorable for the ticket checking apparatus 5 to receive a duplicate of the feature value table 22B from the server 2 through the communication unit 54, and to use the duplicate as the feature value table for ticket checking 52A.

Figure 9:
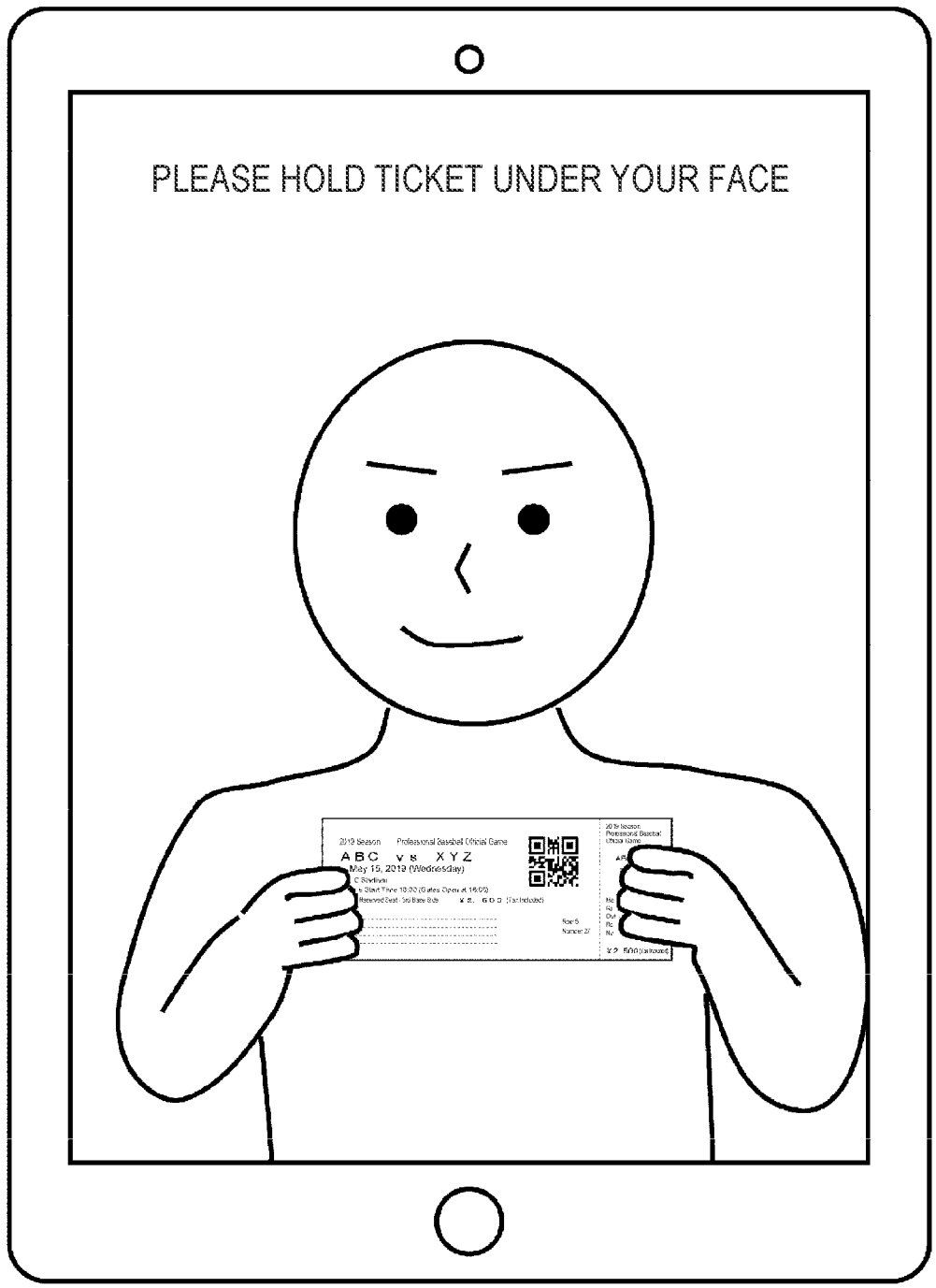
FIG. 9 is a view illustrating one example of a display on a display unit of the ticket checking apparatus.

When admission commences, the ticket checking apparatus 5 starts to capture an image using the camera 55 (step S200). At this time, each visitor who holds a ticket stands in front of the ticket checking apparatus 5 in a manner so that the ticket and the face of the visitor are captured at the same time in an image. At this time, as illustrated in FIG. 9, on the display unit 53 of the ticket checking apparatus 5, it is favorable to display guidance that instructs the visitor to hold the ticket near to their face, the image that is being captured with the camera 55, and the result of the authentication. Note that a configuration may also be adopted so as to capture images of the ticket and the face of the visitor in sequence, and not simultaneously. Further, it is favorable to configure the control unit 51 so that in a case where the control unit 51 recognizes that the visitor is wearing glasses, sunglasses, a mask or the like based on the image captured with the camera 55, the control unit 51 issues an instruction to prompt the visitor to remove the relevant items.

The control unit 51 of the ticket checking apparatus 5 recognizes a face and a QR code from the image captured with the camera 55 (user image) (step S210). The control unit 51 then analyzes the recognized QR code to acquire the feature ID included in the authentication information (step S220). Next, the control unit 51 acquires feature value data corresponding to the acquired feature ID from the feature value table for ticket checking 52A (step S230). The control unit 51 then calculates the similarity between the face included in the video image captured with the camera 55 and the acquired feature value data (step S240).

Note that, when checking tickets, it is favorable to fix the positional relationship between the face and the ticket, such as by causing the visitor to position the ticket below their face and capture an image. Further, it is favorable to adopt a configuration so as to recognize and extract a face that appears at a predetermined position relative to the face of the ticket as the face of the visitor. Alternatively, the face of the visitor may be recognized based on the distance (the depth in the user image) from the ticket checking apparatus 5. For example, a distance measuring sensor or the like may be provided to actually measure the distance to the visitor, or a face that occupies the largest area in the user image among a plurality of faces appearing in the user image may be recognized as the face of the relevant visitor. By adopting such a configuration, even when a plurality of people appear in the video image, the person that is the object of the authentication can be easily identified. The ticket checking apparatus 5 may also be configured so that a plurality of visitors can be authenticated at the same time. In this case, it is favorable to perform authentication of the number of people that is in accordance with the number of recognized QR codes, and to take a face recognized at a predetermined position (for example, above the QR code) with respect to each QR code as an object of the authentication.

Next, the control unit 51 determines whether or not the calculated similarity satisfies a predetermined criterion (the criterion may be made lower than at the time of issuing the ticket) (step S250). The determination in the present step S250 is one example of a determination according to a similarity in the present disclosure. If the similarity satisfies the predetermined criterion (for example, if the matching rate is a predetermined value or more) (step S250: Yes), a notification or the like to the effect that entry is permitted is displayed on the display unit 53 (step S260). On the other hand, if the similarity does not satisfy the predetermined criterion (for example, if the matching rate is less than a predetermined value) (step S250: No), a notification or the like to the effect that entry is permitted is not displayed on the display unit 53, and the red lamp 56 is turned on so as to notify staff that there is a mismatch in the facial authentication. In addition, for example, a warning may be generated by displaying a warning display, emitting a warning sound, or turning on a flashing light or the like (step S270). In this way, the ticket checking processing for one visitor ends upon the completion of either one of steps S260 and S270. Note that, in a case where the similarity does not satisfy the predetermined criterion, the manner in which the result is output is not limited to the example described above. For example, instead of displaying a notification and warning or the like, in order to avoid congestion at the ticket checking station, a configuration may be adopted so that, while outputting the entry permission display to the display unit 53, staff at the ticket checking station are notified to the effect that the similarity does not satisfy the predetermined criterion, and after the visitor has passed though the ticket checking station a staff member confirms whether or not the ticket is being fraudulently used or the like.

At the entrance to the venue for the entertainment, the same processing is performed for each visitor. By means of this configuration, it is possible to smoothly perform checking of tickets at the entrance while preventing fraudulent usage or transfer or the like of tickets.

Second Embodiment

Next, a second embodiment of the present disclosure will be described. The configurations of the ticket issuing system 1 and the ticket checking apparatus 5 of the present embodiment differ from the configurations in the first embodiment with respect to the points described hereunder. Points that are not mentioned specifically hereunder are the same as in the first embodiment, and hence a description thereof is omitted here.

In the ticket issuing system 1 of the present embodiment, the server 2 has a user information database 22C in the storage unit 22. The user information database 22C stores various information pertaining to each user (for example, date of birth, gender, address, telephone number, registration date and the like) and which is linked to a user ID that identifies the user. Further, the ticket database 22A in the present embodiment stores user IDs of the respective users, which are linked to ticket IDs of the respective tickets. Therefore, in the present embodiment, if the ticket ID is identified, it is possible to refer to various attributes of the user by way of the user ID that is linked to the ticket ID.

Further, in the present embodiment, the ticket checking apparatus 5 is configured to be capable of communicating with the server 2 via the network NW. Furthermore, ticket checking processing is carried out in a state in which communication with the server 2 via the network NW is possible in this way.

At a time when a ticket is purchased and issued, a user ID is sent from the ticket purchasing terminal 3 to the server 2 as one piece of information that is necessary for issuing the ticket. The server 2 links the user ID received from the ticket purchasing terminal to a ticket ID of the ticket to be sold, and records this information in the ticket database 22A. Further, in addition to a feature ID corresponding to similar feature value data, the server 2 also includes the ticket ID in the authentication information. A QR code that includes this authentication information is then printed on the face of the ticket.

When the ticket is used, similarly to the first embodiment, the ticket checking apparatus 5 arranged at the ticket checking station recognizes the QR code from an image of the face of the ticket, and analyzes the QR code. Thus, the feature ID and ticket ID included in the authentication information are acquired. Then, with regard to the acquired feature ID, similarly to the first embodiment, the ticket checking apparatus 5 calculates the similarity between the corresponding feature value data and the captured facial image, and utilizes the calculated similarity for authentication. On the other hand, with regard to the acquired ticket ID, the ticket checking apparatus 5 refers to information pertaining to the user that is linked to the relevant ticket ID in the server 2. Specifically, the ticket checking apparatus 5 acquires attribute information such as the age and gender of the user that is linked to the ticket ID from the server 2. The ticket checking apparatus 5 then compares the image of the visitor captured with the camera 55 and the attribute information (that is, determines whether or not the visitor has the relevant attributes). Similarly to the result of comparing the feature value data, the result of comparing the attribute information can be used for determining whether or not to permit passage through the ticket checking station. In this way, the possibility of a person being permitted to pass through a ticket checking station by using a fraudulent method such as impersonation can be reduced. Note that, instead of performing a comparison with the attribute information as described above, the attribute information acquired from the server 2 may be presented to the staff assigned to the ticket checking station, as reference information for visually finding individuals who are attempting to fraudulently pass through the ticket checking station.

Third Embodiment

Next, a third embodiment of the present disclosure will be described. The configurations of the ticket issuing system 1 and the ticket checking apparatus 5 of the present embodiment differ from the configurations in the first embodiment with respect to the points described hereunder. Points that are not mentioned specifically hereunder are the same as in the first embodiment, and hence a description thereof is omitted here.

In the ticket issuing system 1 of the present embodiment, the feature IDs are stored in the ticket database 22A in a manner in which the feature IDs are linked to the ticket IDs of the respective tickets. In the present embodiment, unlike the first embodiment and the like, it is not necessary for similar feature value data of the user to be defined by the time the ticket is printed. If the similar feature value data of the user is defined by the time the ticket is printed, a feature ID corresponding to the similar feature value data is linked to the ticket ID and stored in the ticket database 22A and, similarly to the first embodiment, authentication information including the feature ID (and as necessary, similarly to the second embodiment, a ticket ID) is printed on the face of the ticket as a QR code.

On the other hand, if similar index information of the user is not defined by the time the ticket is printed, a QR code that includes information indicating that a feature ID is not yet set and the ticket ID is printed on the face of the ticket.

Figure 10:
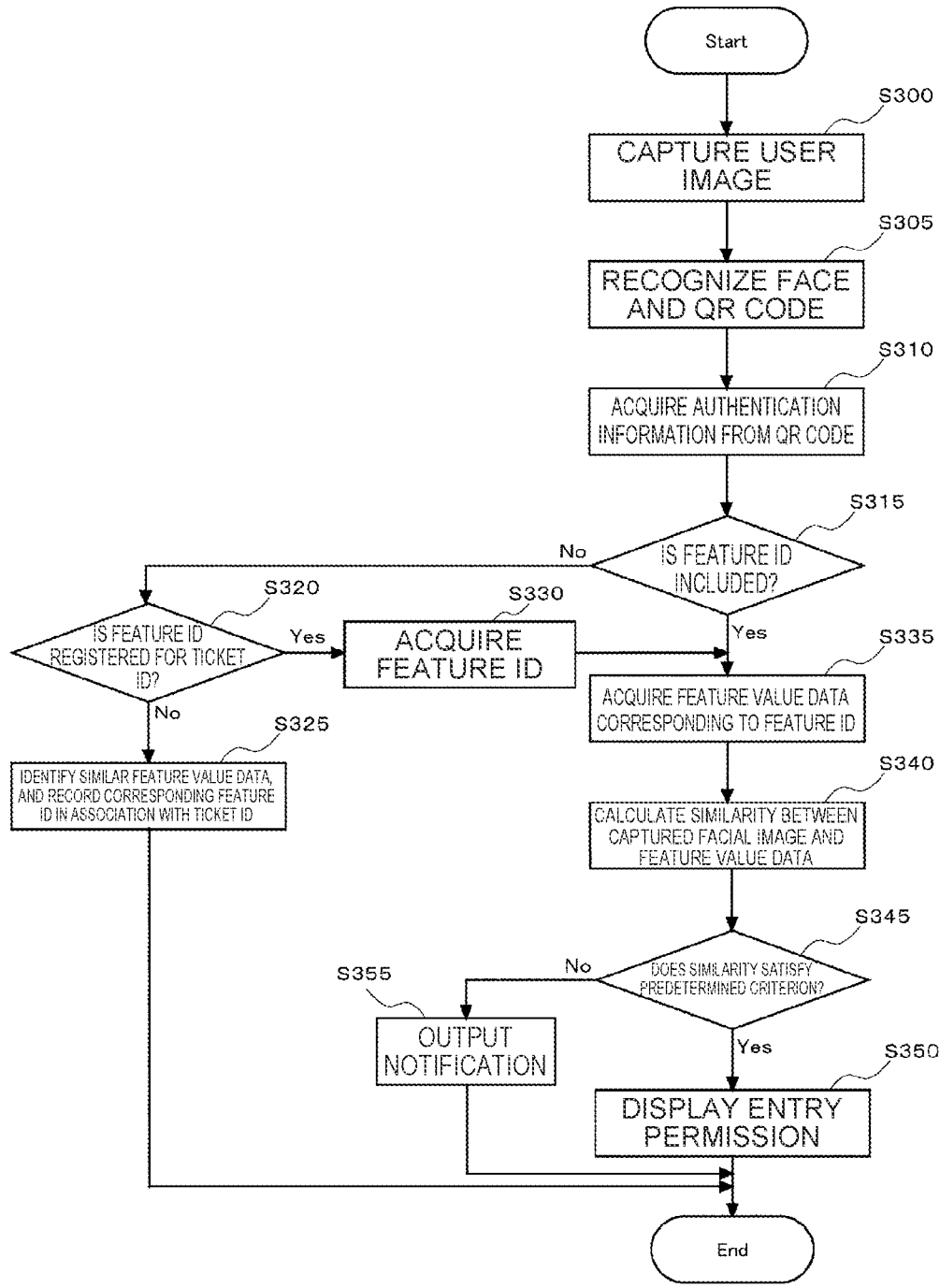
FIG. 10 is a flowchart showing a procedure of ticket checking processing in a third embodiment.

In the present embodiment, the ticket checking apparatus 5 is configured to be capable of communicating with the server 2 via the network NW. Furthermore, ticket checking processing is carried out in a state in which communication with the server 2 via the network NW is possible in this way. Hereunder, the ticket checking processing in the present embodiment is described with reference to the flowchart shown in FIG. 10.

Similarly to the first embodiment, a ticket checking station is provided at the entrance of the venue for the entertainment, and the ticket checking apparatus 5 is installed so that the camera 55 faces in the direction from which visitors come in. When admission commences, the ticket checking apparatus 5 starts to capture an image by means of the camera 55 (step S300). A configuration is adopted so that the ticket and the face of the visitor are included in the captured image.

The control unit 51 of the ticket checking apparatus 5 recognizes a face and a QR code from the image captured with the camera 55 (user image) (step S305). The control unit 51 then analyzes the recognized QR code to acquire the authentication information (step S310). The control unit 51 determines whether or not a feature ID of similar feature value data is included in the authentication information (step S315).

If a feature ID of similar feature value data is not included in the authentication information (step S315: No), the ticket checking apparatus 5 sends a query to the server 2 to ascertain whether or not a feature ID is registered for the acquired ticket ID (step S320). If the server 2 sends a reply to the effect that a feature ID is not registered (step S320: No), the ticket checking apparatus 5 transmits the acquired ticket ID and the image of the visitor captured with the camera 55 to the server 2. Upon receiving the transmitted ticket ID and image, the server 2 identifies similar feature value data from the feature value table 22B by the same method as the method used in the first embodiment, and links the feature ID corresponding to the similar feature value data to the ticket ID and stores this information in the ticket database (step S325). If a feature ID of similar feature value data is not included in the authentication information, the ticket checking processing is concluded at this point. As shown in the processing in step S325, the server 2 functions as the similar feature value data identification means and the similar feature value data recording means in the present disclosure. Note that the ticket checking apparatus 5 may use the feature value table for ticket checking 52A to identify similar feature value data and a corresponding feature ID. In this case, it suffices for the ticket checking apparatus 5 to transmit the ticket ID and the feature ID of the similar feature value data that was identified to the server 2.

On the other hand, if the server 2 sends a reply to the effect that a feature ID is registered (step S320: Yes), the ticket checking apparatus 5 acquires the feature ID linked to the ticket ID from the server 2 (step S330), and acquires feature value data corresponding to the feature ID from the feature value table for ticket checking 52A (step S335). The control unit 51 of the ticket checking apparatus 5 then calculates the similarity between the face of the visitor included in the video image captured with the camera 55 and the acquired feature value data (step S340). Next, the control unit 51 determines whether or not the calculated similarity satisfies a predetermined criterion (for example, that the matching rate is a predetermined value or more) (step S345). The determination in the present step S345 is one example of a determination depending on similarity in the present disclosure. If the similarity satisfies the predetermined criterion (step S345: Yes), a notification or the like to the effect that entry is permitted is displayed on the display unit 53 (step S350). On the other hand, if the similarity does not satisfy the predetermined criterion (step S345: No), a notification or the like to the effect that entry is permitted is not displayed on the display unit 53, and the red lamp 56 is turned on so as to notify staff that there is a mismatch in the facial authentication. In addition, for example, a warning may be generated by displaying a warning display, emitting a warning sound, or turning on a flashing light or the like (step S355). The ticket checking processing for one visitor ends upon the completion of either one of steps S350 and S355.

On the other hand, if a feature ID of similar feature value data is included in the authentication information (step 315: Yes), the processing in steps S335 to S355 is executed using the relevant feature ID. That is, similarly to the first embodiment, a determination as to whether or not to permit passage through the ticket checking station is made by performing an authentication using similar feature value data.

As described above, according to the present embodiment, even in a case where similar feature value data could not be defined by the time the ticket is printed, it is possible to link similar feature value data to the ticket for the first time when passing through the ticket checking station, and at a subsequent time that the ticket is checked (for example, at a time of re-entry), use of the ticket by a different user to the user who used the ticket the first time can be prevented.

Note that, in the present embodiment, similarly to the second embodiment, the server 2 may hold the user information database 22C in the storage unit 22 and may link the facial image of the user that was acquired at the time of the initial entry (or a feature ID acquired thereafter) to the user ID and store this information in the user information database 22C. The facial image (or feature ID) of a user stored in this way may be used for generating authentication information when the relevant user purchases a new ticket.

Fourth Embodiment

Next, a fourth embodiment of the present disclosure will be described. The configurations of the ticket issuing system 1 and the ticket checking apparatus 5 of the present embodiment differ from the configurations in the respective embodiments described above with respect to the points described hereunder. Points that are not mentioned specifically hereunder are the same as in the first embodiment and the like, and hence a description thereof will be omitted.

Although in the first embodiment a ticket is printed on paper from the ticket issuing machine, in the ticket issuing system of the present embodiment a so-called "electronic ticket" is adopted with which a ticket is not printed on paper, and instead the face of the ticket is displayed on a portable terminal such as a smartphone, and ticket checking processing is performed using the thus-displayed face of the ticket. Further, in the present embodiment, similarly to the second embodiment, the user information database 22C is stored in the storage unit 22, and a user ID is linked to and stored in association with various information pertaining to the user (which at least includes information showing the destination to which to send the electronic ticket) in the user information database 22C. Further, the ticket database 22A stores the user ID of the user of the ticket linked to the ticket ID.

In the present embodiment, unlike the first embodiment and the like, it is not necessary that similar feature value data of the user is defined by the time the ticket is used (that is, the time when the ticket is subjected to ticket checking processing). If the similar feature value data of the user is defined by the time the ticket checking processing is performed, authentication information including a feature ID corresponding to the relevant similar feature value data is recorded on the electronic ticket. Note that, with respect to the authentication information, a configuration may be adopted in which the authentication information is displayed as a QR code on the ticket face and is then read by the ticket checking apparatus 5 when checking the ticket, or a configuration may be adopted in which the authentication information is transmitted to the ticket checking apparatus 5 utilizing wireless communication or the like without displaying the authentication information on the screen of the portable terminal.

In a state in which the similar feature value data of the user has been defined, a feature ID corresponding to the similar feature value data is included in the authentication information recorded in the electronic ticket. On the other hand, in a state in which the similar feature value data of the user is not defined, information indicating that a feature ID has not yet been set is included in the authentication information that is recorded in the electronic ticket. Thereafter, in response to the similar feature value data being defined, the authentication information is updated to authentication information that includes a feature ID corresponding to the similar feature value data. For example, in a case where authentication information is displayed as a QR code on the ticket face, the QR code that is displayed on the ticket face will be changed between before and after the time that the similar feature value data is defined.

Figure 11:
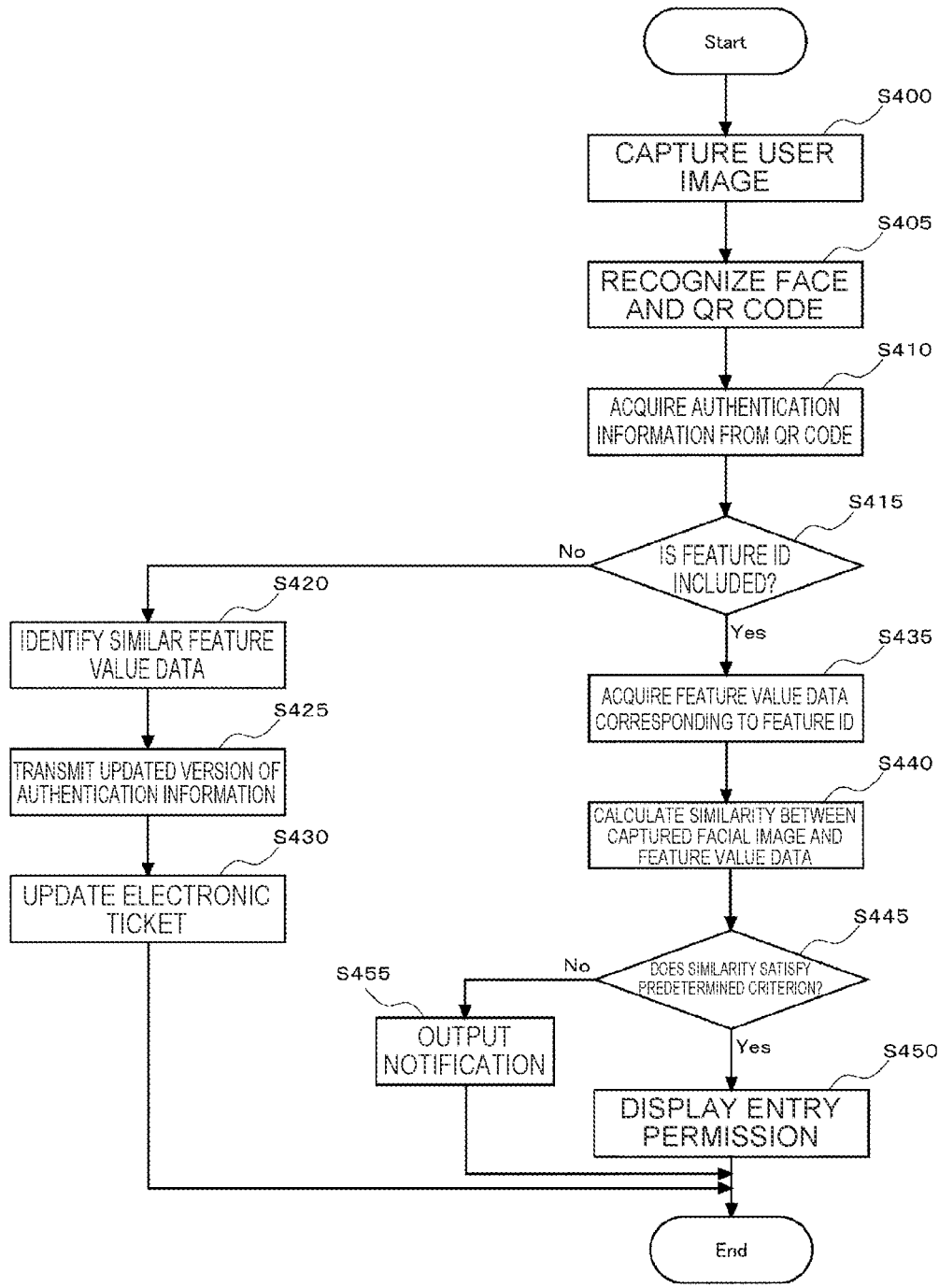
FIG. 11 is a flowchart showing a procedure of ticket checking processing in a fourth embodiment.

Next, the ticket checking processing in the present embodiment will be described referring to the flowchart shown in FIG. 11. Note that, in the following description, a form in which authentication information is displayed as a QR code on the face of the ticket is described as an example.

Similarly to the first embodiment, a ticket checking station is provided at the entrance of the venue for the entertainment, and the ticket checking apparatus 5 is installed so that the camera 55 faces in the direction from which visitors come in. When admission commences, the ticket checking apparatus 5 starts to capture an image by means of the camera 55 (step S400). A configuration is adopted so that the face of the ticket displayed on a screen of a portable terminal which the visitor holds and the face of the visitor are included in the captured image.

The control unit 51 of the ticket checking apparatus 5 recognizes a face and a QR code from the image (user image) captured with the camera 55 (step S405). The control unit 51 then analyzes the recognized QR code to acquire the authentication information (step S410). The control unit 51 determines whether or not a feature ID of similar feature value data is included in the authentication information (step S415).

If a feature ID of similar feature value data is not included in the authentication information (step 415: No), the ticket checking apparatus 5 transmits the acquired ticket ID and the image of the visitor captured with the camera 55 to the server 2. The server 2 that receives the acquired ticket ID and the image of the visitor identifies similar feature value data from the feature value table 22B by the same method as the method used in the first embodiment (step S420). Note that, the ticket checking apparatus 5 may use the feature value table for ticket checking 52A to perform identification of similar feature value data and a corresponding feature ID. In this case, it is favorable for the ticket checking apparatus 5 to transmit the ticket ID and the feature ID of the similar feature value data that was identified to the server 2. Further, at this time the server 2 may link the feature ID corresponding to the similar feature value data to the ticket ID and store this information in the ticket database.

Next, the server 2 generates an updated version of the authentication information that includes the feature ID corresponding to the similar feature value data, and transmits the updated version of the authentication information to the user who has the user ID linked to the ticket ID (step S425). In the portable terminal of the user, the electronic ticket is updated so as to use the received updated version of the authentication information at the time of a subsequent ticket check (step S430). In a case where a feature ID of similar feature value data is not included in the authentication information, the ticket checking processing is concluded at this point.

On the other hand, if a feature ID of similar feature value data is included in the authentication information (step 415: Yes), the control unit 51 acquires the feature value data corresponding to the feature ID from the feature value table for ticket checking 52A (step S435). The control unit 51 of the ticket checking apparatus 5 then calculates the similarity between the face of the visitor included in the video image captured with the camera 55 and the acquired feature value data (step S440). Next, the control unit 51 determines whether or not the calculated similarity satisfies a predetermined criterion (for example, that the matching rate is a predetermined value or more) (step S445). The determination in the present step S445 is one example of a determination depending on similarity in the present disclosure. If the similarity satisfies the predetermined criterion (step S445: Yes), a notification or the like to the effect that entry is permitted is displayed on the display unit 53 (step S450). On the other hand, if the similarity does not satisfy the predetermined criterion (step S445: No), a notification or the like to the effect that entry is permitted is not displayed on the display unit 53, and the red lamp 56 is turned on so as to notify staff that there is a mismatch in the facial authentication. In addition, for example, a warning may be generated by displaying a warning display, emitting a warning sound, or turning on a flashing light or the like (step S455). The ticket checking processing for one visitor ends upon the completion of either one of steps S450 and S455.

As described above, according to the present embodiment, even in a case where similar feature value data could not be defined by the time of the initial ticket check, it is possible to link similar feature value data to the electronic ticket for the first time when passing through the ticket checking station, and at a subsequent time that the ticket is checked (for example, at a time of re-entry), use of the ticket by a different user to the user who used the ticket the first time can be prevented.

Note that, in the present embodiment, similarly to the second embodiment, the server 2 may hold the user information database 22C in the storage unit 22 and may link the facial image of the user that was acquired at the time of the initial entry (or a feature ID acquired thereafter) to the user ID and store this information in the user information database 22C. The facial image (or feature ID) of a user stored in this way may be used for generating authentication information when the relevant user purchases a new ticket.

Fifth Embodiment

Next, a fifth embodiment of the present disclosure will be described. The configurations of the ticket issuing system 1 and the ticket checking apparatus 5 of the present embodiment differ from the configurations in the respective embodiments described above with respect to the points described hereunder. Points that are not mentioned specifically hereunder are the same as in the first embodiment and the like, and hence a description thereof will be omitted.

Although in the first embodiment a ticket is issued on which a feature ID is included in a QR code as authentication information that is recorded on the ticket, in the ticket issuing system of the present embodiment the authentication information that is recorded on a ticket does not include a feature ID, and instead includes a ticket ID for identifying the relevant ticket. Further, the ticket database 22A stores a user ID of a user of the relevant ticket that is linked to a ticket ID. Furthermore, in addition to the feature value table for ticket checking 52A, the ticket checking apparatus of the present embodiment includes a ticket information table 52B in which a ticket ID of a ticket that can be utilized at the entertainment at which the ticket checking is carried out and a feature ID which corresponds to the user of the relevant ticket are stored in association with each other.

Figure 12:
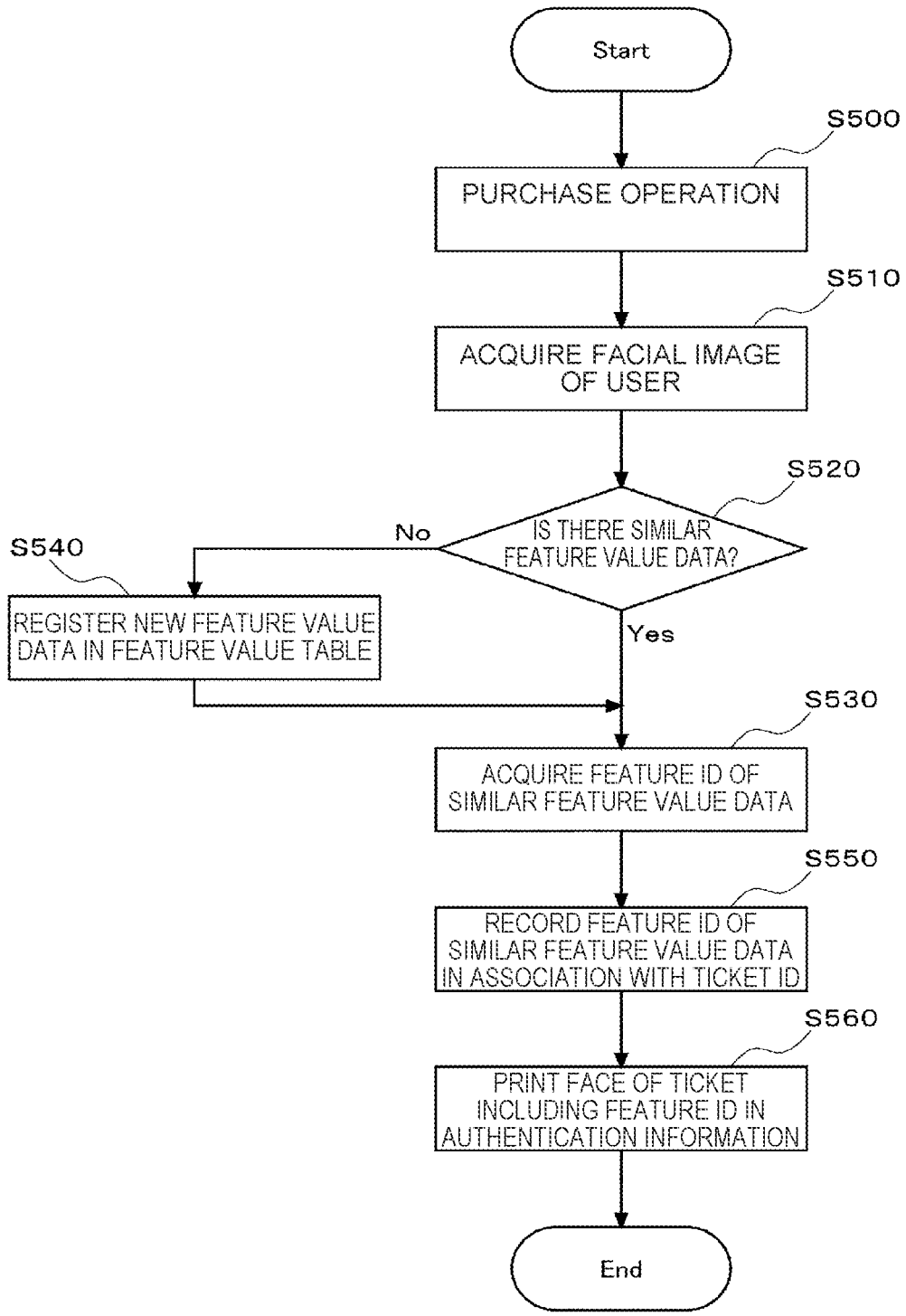
FIG. 12 is a flowchart showing a procedure of ticket issuing processing in a fifth embodiment.

FIG. 12 illustrates a procedure of ticket issuing processing for issuing a ticket by the ticket issuing system 1 of the present embodiment.

In the present example, issuing of a ticket is performed when a purchaser or a sales assistant in a ticket sales office operates the ticket purchasing terminal 3. In the present example, a case in which the purchaser themselves will be the user of the ticket (that is, the person who will utilize the ticket to pass through the entrance to the entertainment) is described as an example. First, the purchaser or a sales assistant in a ticket sales office performs a purchase operation at the ticket purchasing terminal 3 by selecting the entertainment, the seat type and the like, and pressing a purchase button or the like (step S500). The ticket purchasing terminal 3 sends information showing the selected ticket as well as a facial image of the user to the server 2, and the server 2 acquires the information and facial image (step S510). The facial image may be captured with the camera 35 of the ticket purchasing terminal 3, or a facial image which the user photographed in advance may be transferred into the ticket purchasing terminal 3 by wired or wireless communication.

The server refers to the feature value table 22B to check for the facial image of the user received from the ticket purchasing terminal 3 (step S520). At this time, if there is feature value data for which the similarity with the facial image of the user satisfies a predetermined criterion (step S520: Yes), the server 2 identifies one item of similar feature value data for which the similarity with the facial image of the user satisfies the predetermined criterion, and acquires the feature ID that corresponds to the identified similar feature value data item (step S530). Note that, after identifying the similar feature value data, it is preferable that the server 2 completely deletes the facial image of the user from the server 2.

If feature value data for which the similarity with the facial image of the user satisfies a predetermined criterion is not included in the feature value table 22B (step S520: No), the server 2 registers new feature value data that is based on the facial image of the user in the feature value table 22B (step S540), and then identifies the relevant new feature value data as similar feature value data, and acquires the feature ID of the new feature value data (step S530).

Upon the similar feature value data being identified, the server 2 links the feature ID of the identified similar feature value data with the ticket ID of the ticket to be purchased, and stores the feature ID in the ticket database 22A (step S550).

Next, the server 2 generates information to print on the face of the ticket, and transmits the information to the ticket issuing machine 4 (step S560). The information to print on the face of the ticket includes authentication information that is required when the ticket is checked at the time of entry, information that shows the entertainment, information that shows the ticket type, and the like. In the present example, the authentication information is a QR code (registered trademark) that includes a ticket ID and does not include a feature ID.

At the ticket issuing machine 4 that receives the information to print on the face of the ticket, characters showing information on the entertainment and information on the ticket type and the like, and a QR code that includes the authentication information are printed on the face of the ticket.

The ticket issued in the manner described above not only does not include personal information such as a facial image of the user in the authentication information, but also does not even include a feature ID associated with facial features of the user, and therefore leakage of personal information through the ticket can be prevented.

FIG. 13 is a flowchart showing a procedure of ticket checking processing that individual visitors are subjected to at a ticket checking station provided at an entrance to the venue for the entertainment such as an event to check a ticket issued by the ticket issuing system 1 of the present embodiment.

A ticket checking station is provided at the entrance of the venue for the entertainment, and the ticket checking apparatus 5 is installed so that the camera 55 faces in the direction from which visitors come in. The feature value table for ticket checking 52A in which the feature value data that was used when issuing tickets is stored, and the ticket information table 52B in which a similar feature ID of the user of each ticket is stored in association with the ticket ID of the tickets that can be utilized for entry into the entertainment are stored in advance (before the admission start time) in the ticket checking apparatus 5. Note that it is favorable for the ticket checking apparatus 5 to receive a duplicate of the feature value table 22B and the ticket database 22A from the server 2 through the communication unit 54, and to use these as the feature value table for ticket checking 52A and the ticket information table 52B, respectively.

When admission commences, the ticket checking apparatus 5 starts to capture an image using the camera 55 (step S600). At this time, each visitor who holds a ticket stands in front of the ticket checking apparatus 5 in a manner so that the ticket and the face of the visitor are captured at the same time in an image. At this time, similarly to the first embodiment, it is favorable to display guidance that instructs the visitor to hold the ticket near to his/her face, the image that is being captured with the camera 55, and the result of the authentication on the display unit 53 of the ticket checking apparatus 5.

The control unit 51 of the ticket checking apparatus 5 recognizes a face and a QR code from the image captured with the camera 55 (user image) (step S610). The control unit 51 then analyzes the recognized QR code to acquire the ticket ID included in the authentication information (step S620). Next, the control unit 51 refers to the ticket information table 52B to identify the feature ID corresponding to the acquired ticket ID, and acquires feature value data corresponding to the identified feature ID from the feature value table for ticket checking 52A (step S630). The control unit 51 then calculates the similarity between the face included in the video image captured with the camera 55 and the acquired feature value data (step S640).

Next, the control unit 51 determines whether or not the calculated similarity satisfies a predetermined criterion (the criterion may be made lower than at the time of issuing the ticket) (step S650). The determination in the present step S650 is one example of a determination according to a similarity in the present disclosure. If the similarity satisfies the predetermined criterion (for example, if the matching rate is a predetermined value or more) (step S650: Yes), a notification or the like to the effect that entry is permitted is displayed on the display unit 53 (step S660). On the other hand, if the similarity does not satisfy the predetermined criterion (for example, if the matching rate is less than a predetermined value) (step S650: No), a notification to the effect that entry is permitted is not displayed on the display unit 53, and the red lamp 56 is turned on so as to notify staff that there is a mismatch in the facial authentication. In addition, for example, a warning may be generated by displaying a warning display, emitting a warning sound, or turning on a flashing light or the like (step S670). In this way, the ticket checking processing for one visitor ends upon the completion of either one of steps S660 and S670. Note that, in a case where the similarity does not satisfy the predetermined criterion, the manner in which the result is output is not limited to the example described above. For example, instead of displaying a notification and warning or the like, in order to avoid congestion at the ticket checking station, a configuration may be adopted so that, while outputting the entry permission display to the display unit 53, staff at the ticket checking station are notified to the effect that the similarity does not satisfy the predetermined criterion, and after the visitor has passed though the ticket checking station a staff member confirms whether or not the ticket is being fraudulently used or the like.

At the entrance to the venue for the entertainment, the same processing is performed for each visitor. By means of this configuration, it is possible to smoothly perform checking of tickets at the entrance while preventing fraudulent usage or transfer or the like of tickets.

Modifications of the Embodiments

Note that, whilst embodiments of the present disclosure have been described above, the present disclosure is not limited to these examples. For example, although authentication by means of a facial image is performed in the above embodiments, authentication by means of other biometric information (for example, a fingerprint, an iris, a vein, or myoelectric potential) instead of a facial image may be adopted. In this case, it suffices to adopt a configuration in which a plurality of patterns (that is, indexes) of biometric information are linked to feature IDs and stored in advance in the feature value table, and to include a feature ID corresponding to a pattern that is close to the biometric information of the user in the authentication information.

Further, although in the respective embodiments described above one feature ID is included in the authentication information, a plurality of feature IDs may be included in the authentication information. For example, a predetermined number (for example, 3) of items of similar feature value data may be identified in order of highest matching rate with the facial image of the user, and the feature IDs corresponding to each of these items of similar feature value data may be included in the authentication information. Further, the feature value data included in the feature value table may be classified into groups, and similar feature value data items for which the matching rate with the facial image of the user is higher than a predetermined value may be identified from each group, and the feature IDs corresponding to the respective items of similar feature value data may be included in the authentication information.

In a case where a plurality of feature IDs are included in authentication information recorded on a ticket, the ticket checking apparatus may be configured to allow passage through the ticket checking station if a matching rate with feature value data corresponding to a predetermined number of feature IDs (the number may be set to any of one, some, or all of the feature IDs) among the plurality of feature IDs. Further, information (an entertainment ID or the like) pertaining to the entertainment which can be entered using the ticket may be included in the authentication information, and the ticket checking apparatus may determine whether or not to permit entry based on the information pertaining to the entertainment that is included in the authentication information.

Further, in the respective embodiments described above, in the ticket checking apparatus 5, as a determination according to similarity, the similarity between acquired biometric information (that is, a facial image) of the user and feature value data corresponding to a feature ID linked to the ticket is compared, and a determination (determination regarding whether to permit entry or the like) is made according to the comparison result, however, another method may be used to make the determination. For example, a configuration may be adopted in which, based on biometric information of the user that is acquired at the ticket checking apparatus 5, feature value data that is similar to feature information pertaining to the relevant biometric information is newly obtained and a feature ID corresponding to the newly obtained feature value data is identified, and a determination is made based on the result of a comparison between the feature ID identified at the ticket checking apparatus 5 and a feature ID linked to the ticket.

Specifically, a determination may be made based on whether or not the similar feature ID identified at the ticket checking apparatus 5 and the feature ID that is linked to the ticket are identical. Further, a configuration may be adopted in which a plurality of similar feature IDs are linked to the ticket and a plurality of feature IDs are identified at the ticket checking apparatus 5, and a determination is made based on whether or not the number of matching feature IDs reaches a predetermined number.

Further, whilst in the respective embodiments described above, when issuing a ticket and when checking a ticket, processing is performed for identifying similar feature value data for which the similarity with a facial image satisfies a predetermined criterion, a predetermined criterion that is used at such time is arbitrary. For example, a condition that a matching rate with feature value data is a predetermined value or more may be set as the predetermined criterion.

Alternatively, a configuration may be adopted in which a comparison with a predetermined value is not performed, and a condition that a matching rate with facial information is the largest is set as a predetermined criterion, and feature value data with the largest matching rate (in the case of identifying a plurality of items of similar feature value data, up to a predetermined number in sequential order from the largest matching rate) is identified as similar feature value data.

Further, although in the foregoing first embodiment, when purchasing a ticket a facial image of the user (the actual purchaser) is captured with the ticket purchasing terminal 3 and transmitted to the server 2, a configuration may be adopted so that, after purchasing a ticket, a facial image of the user (may be a different person to the purchaser) is transmitted to the server 2 before the ticket is issued. Specifically, a configuration may be adopted so that, when a ticket is purchased, information for accessing a website for issuing the ticket is issued from the server 2, and the user accesses the relevant website for issuing the ticket and sends a photograph to the server 2 before the time that the ticket is issued later. In this case, upon receiving the photograph, the server 2 may issue information for issuing a ticket (for example, identification information and a password) to the purchaser, and the purchaser may then bring the information for issuing a ticket to a store or the like where the ticket issuing machine 4 is installed and use the information to issue the ticket. Adopting such a configuration facilitates the purchase of a plurality of tickets together by a purchaser, and registration of the facial images of the visitors for the respective tickets.

Further, a configuration may be adopted in which an image of a face (a likeness) that is generated based on similar feature value data and which has a high matching rate with the relevant similar feature value data is printed on the face of a ticket in addition to the information described above. By adopting this configuration, the owner of the ticket can be estimated, and in a case where multiple tickets were purchased or the like, the respective tickets can be distributed to the correct owners. In addition, in a case where information pertaining to the user has been linked to a ticket, information pertaining to the user may be printed on the ticket face.

Further, although in the above embodiments the feature value data is registered in the feature value table 22B in advance, feature value data need not be registered in advance in the feature value table 22B. That is, a configuration may be adopted in which feature value data is not included as the initial state of the feature value table 22B. In this case, if feature value data for which the matching rate is a predetermined value or more is not included in the feature value table 22B (always in the case of the first person for whom a ticket is issued), it suffices to register feature value data that is based on the facial image of the purchaser in the feature value table 22B. By adopting this configuration, the feature value data included in the feature value table 22B will differ for each respective entertainment. As a result, even if a large quantity of authentication information is analyzed, it will not be possible to estimate and generate authentication information, and thus fraud can be effectively prevented.

Further, although in the above embodiments the authentication information is printed as a QR code on the face of the tickets, the authentication information may be recorded on the ticket by another method as long as the authentication information can be recognized by the ticket checking apparatus 5. For example, a bar code, a character string, a figure or the like may be printed on the face of the ticket as authentication information. For example, a configuration may be adopted in which a storage medium that can hold electronic data such as a memory is provided in the ticket, and authentication information that is recorded in the storage medium is transmitted to the ticket checking apparatus 5 by arbitrary means such as wireless communication (for example, short-range wireless communication using an RF tag) or visible light communication. Alternatively, a configuration may be adopted in which an IC chip that stores authentication information is embedded in the ticket, and the ticket checking apparatus 5 reads the authentication information stored in the IC chip by wired or wireless communication.

Further, although a case of applying the ticket issuing system and the ticket checking apparatus to a paper ticket is described as an example in the above embodiments, the ticket may be an electronic ticket that is realized using a portable terminal such as a smartphone.

Further, although in the above embodiments, the ticket checking apparatus 5 at the ticket checking station captures an image of the ticket and of the face of the visitor simultaneously with one camera 55, an image of the ticket and an image of the face of the visitor may be captured at timings that are different to each other and/or may be captured with different devices. For example, an image of the face of the visitor may be captured with the camera 55, and the QR code printed on the ticket may be read with a QR code reader that is separately provided.

Further, although in the foregoing first embodiment a case in which a ticket that is issued is printed on special purpose paper from the dedicated ticket issuing machine 4 is described as an example, a configuration may be adopted in which the ticket is printed on plain paper from an ordinary printer that is in the home of the purchaser or the like. In this case, the ordinary printer that is in the home of the purchaser of the ticket can be interpreted as serving the role of a ticket issuing machine.

In addition, modifications and the like arrived at as a result of a person skilled in the art appropriately adding, deleting, or changing the design of constituent elements of the above-described embodiments, or appropriately combining features of respective embodiments that are described above are also included in the scope of the present invention, as long as such modifications and the like include the gist of the present invention.

The invention claimed is:

1. A ticket issuing system comprising a processor and a storage with instructions thereon, wherein the storage stores a feature value table that associates and stores feature value data including feature information pertaining to exemplary biometric information and a feature ID for identifying the feature value data, and
the instructions upon execution by the processor, cause the processor to:
acquire user feature information pertaining to biometric information of a user of a ticket to be issued;
identify, from among the feature value data stored in the feature value table, similar feature value data for which a similarity with the user feature information satisfies a predetermined criterion to obtain a feature ID corresponding to the similar feature value data; and
issue a ticket on which authentication information that includes the feature ID corresponding to the similar feature value data is recorded.

2. The ticket issuing system according to claim 1, wherein:
the authentication information includes feature IDs corresponding to a plurality of items of feature value data.

3. The ticket issuing system according to claim 1, wherein:
the instructions upon execution by the processor, cause the processor to record the feature ID on a face of the ticket in a machine-readable form.

4. The ticket issuing system according to claim 1, wherein:
in addition to the feature ID, the authentication information includes at least one of a ticket ID for identifying the ticket or information pertaining to entertainment which it is possible to enter using the ticket.

5. The ticket issuing system according to claim 1, wherein:
the feature information pertaining to the biometric information is feature information pertaining to an appearance of a face of a person.

6. The ticket issuing system according to claim 5, wherein:
feature value data stored in the feature value table includes feature information pertaining to an appearance of a non-existent person.

7. The ticket issuing system according to claim 1, wherein the instructions upon execution by the processor, cause the processor to:
register, in a case where the similar feature value data is not identified, new feature value data for which a similarity with the user feature information satisfies a predetermined criterion in the feature value table.

8. A ticket issuing system comprising a processor and a storage with instructions thereon, wherein the storage stores a feature value table that associates and stores feature value data including feature information pertaining to exemplary biometric information and a feature ID for identifying the feature value data, and
the instructions upon execution by the processor, cause the processor to:
acquire user feature information pertaining to biometric information of a user of a ticket to be issued;
identify, from among the feature value data stored in the feature value table, similar feature value data for which a similarity with the user feature information satisfies a predetermined criterion to obtain a feature ID corresponding to the similar feature value data;
issue a ticket on which authentication information that includes a ticket ID for identifying a ticket that is issued is recorded; and
record the feature ID corresponding to the similar feature value data in association with the ticket ID.

9. The ticket issuing system according to claim 8, wherein:
the feature information pertaining to the biometric information is feature information pertaining to an appearance of a face of a person.

10. The ticket issuing system according to claim 9, wherein:
feature value data stored in the feature value table includes feature information pertaining to an appearance of a non-existent person.

11. The ticket issuing system according to claim 8, wherein the instructions upon execution by the processor, cause the processor to:
register, in a case where the similar feature value data is not identified, new feature value data for which a similarity with the user feature information satisfies a predetermined criterion in the feature value table.

12. A ticket checking apparatus comprising a processor and a storage with instructions thereon, wherein the storage stores a feature value table that associates and stores feature value data that is feature information pertaining to exemplary biometric information and a feature ID, and the instructions upon execution by the processor, cause the processor to:

acquire biometric information of a user who uses a ticket;

calculate user feature information with respect to the biometric information of the user;

acquire a target feature ID that is recorded on the ticket;

acquire a reference feature value data associated with the target feature ID by referring to the feature value table;

determine a similarity between the user feature information and the reference feature value data; and output the result of determination according to the similarity.

13. The ticket checking apparatus according to claim 12, the instructions upon execution by the processor, cause the processor to:

identify, in a case where the target feature ID is not recorded on the ticket, from among the feature value data stored in the feature value table, similar feature value data for which a similarity with the user feature information satisfies a predetermined criterion to obtain a feature ID corresponding to the similar feature value data; and record the feature ID corresponding to the similar feature value data in association with information on the ticket.

14. The ticket checking apparatus according to claim 12, wherein:

the target feature ID is recorded on the ticket in a machine-readable form; and the instructions upon execution by the processor, cause the processor to read a feature ID which is recorded on the ticket that the user holds to acquire the target feature ID.

15. The ticket checking apparatus according to claim 12, wherein:

the feature information pertaining to the biometric information is feature information pertaining to an appearance of a face of a person.

16. The ticket checking apparatus according to claim 15, wherein the instructions upon execution by the processor, cause the processor to acquire, from an imaging device, a user image that includes a face of the user, and identify the user appearing in the user image based on a distance from the imaging device to a person appearing in the user image.

17. The ticket checking apparatus according to claim 15, wherein the instructions upon execution by the processor, cause the processor to:

acquire, from an imaging device, a user image that includes a face of the user and the ticket which the user holds; and analyze the user image to read the target feature ID which is recorded on the ticket which the user holds.

18. The ticket checking apparatus according to claim 17, wherein the instructions upon execution by the processor, cause the processor to recognize, in the user image, a face appearing at a predetermined position relative to a face of the ticket as the face of the user; and calculate feature information pertaining to an appearance of the face of the user.

19. A ticket checking apparatus comprising a processor and a storage with instructions thereon, wherein the storage stores:

a feature value table that associates and stores feature value data that is feature information pertaining to exemplary biometric information and a feature ID; and a ticket information table that associates and stores a ticket ID for identifying a ticket and the feature ID corresponding to a user of the ticket, and the instructions upon execution by the processor, cause the processor to:

acquire biometric information of a user who uses a ticket;

calculate user feature information with respect to the biometric information of the user who uses the ticket;

acquire a target ticket ID that is recorded on the ticket;

acquire a reference feature value data associated with the target feature ID by referring to the ticket information table and the feature value table; and determine a similarity between the user feature information and the reference feature value data; and output the result of determination according to the similarity.

* * * * *